United States Patent [19]

Goldstein et al.

[11] Patent Number: 5,043,891

[45] Date of Patent: Aug. 27, 1991

[54] DOCUMENT GENERATION APPARATUS AND METHODS

[75] Inventors: Henry Goldstein, Waltham, Mass.;
David F. Shannon, Nashua, N.H.;
Richard W. Bolling, Brookline, N.H.;
Eric Rustici, Londonderry, N.H.

[73] Assignee: Wang Laboratories, Inc., Lowell, Mass.

[21] Appl. No.: 403,256

[22] Filed: Sep. 5, 1989

Related U.S. Application Data

[63] Continuation-in-part of Ser. No. 371,434, Jun. 5, 1989, Pat. No. 4,967,368, which is a continuation-in-part of Ser. No. 30,250, Mar. 24, 1987, Pat. No. 4,916,633, which is a continuation of Ser. No. 766,860, Aug. 16, 1985, abandoned.

[51] Int. Cl.$^5$ .............................................. G06F 15/00
[52] U.S. Cl. .................................... 364/419; 364/513
[58] Field of Search ............... 364/513, 419, 200, 900, 364/274.5, 943.44

[56] References Cited

U.S. PATENT DOCUMENTS

| | | | |
|---|---|---|---|
| 3,715,730 | 2/1973 | Smith et al. | 364/200 |
| 3,716,840 | 2/1973 | Masten et al. | 364/200 |
| 4,286,330 | 8/1981 | Isaacson | 364/900 |
| 4,290,114 | 9/1981 | Sinary | 364/900 |
| 4,599,692 | 7/1986 | Tan et al. | 364/513 |
| 4,649,515 | 3/1987 | Thompson et al. | 364/513 |

*Primary Examiner*—Allen R. MacDonald
*Attorney, Agent, or Firm*—Michael H. Shanahan; Scott K. Peterson

[57] ABSTRACT

A document generation system which employs a definition-based expert system and an editor to produce an output document from a template document and expert system responses. The knowledge base of the expert system consists of a hierarchy of terms and their definitions. To produce an expert response, an inference engine component of the expert system evaluates a term by evaluating all of the definitions for the terms which are in that term's hierarchy of definitions. In the document generation system, the terms include fragment terms which are defined as portions of the template document.

8 Claims, 13 Drawing Sheets

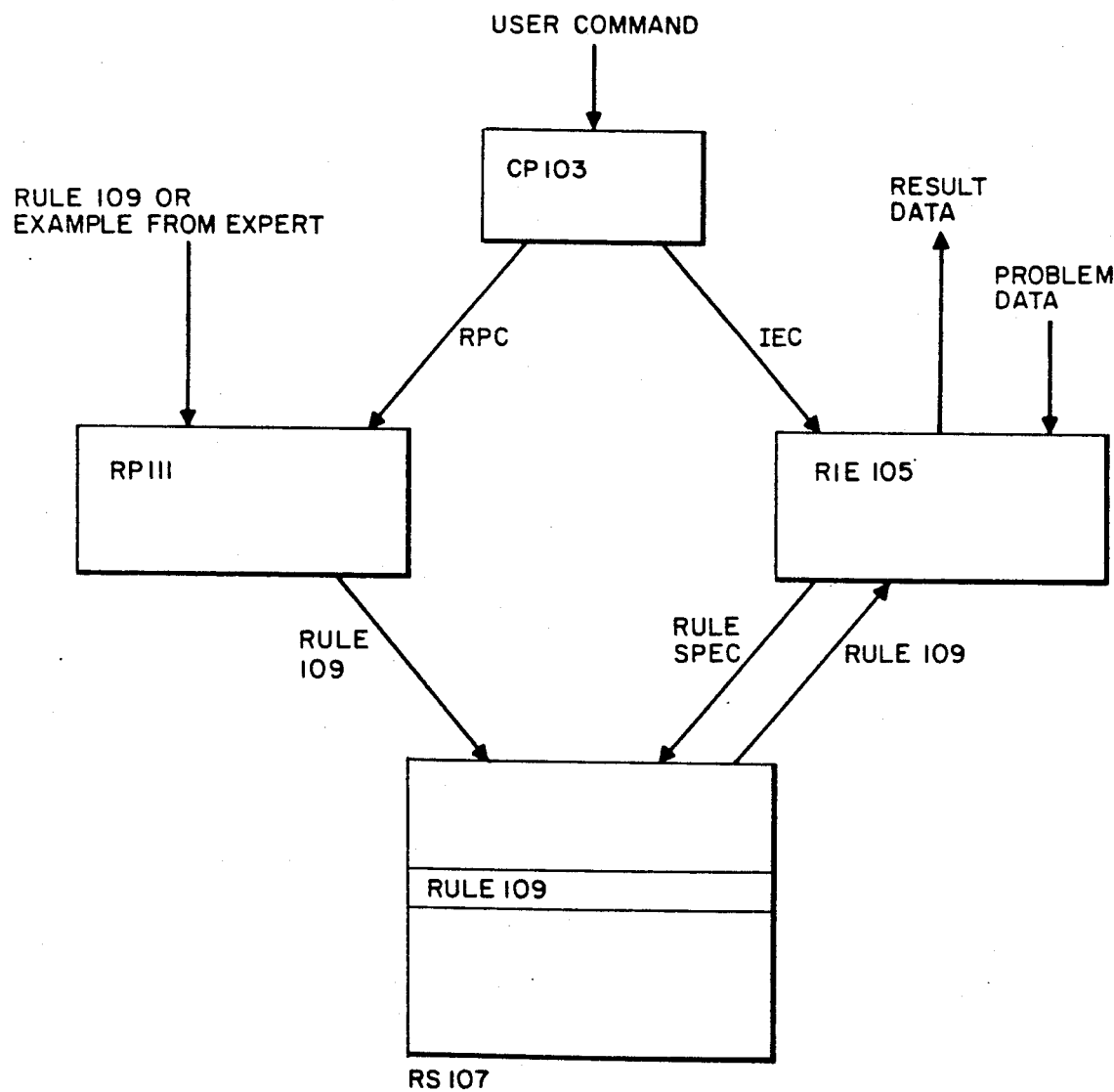
FIG. IA

| TERM 206 | DESC 205 |
|---|---|
| FRAUD | |
| KNOWING — MISREPRESENTATION | KNOWING — MISREPRESENTATION AND DETRIMENTAL — RELIANCE |
| MISREPRESENTATION | MISREPRESENTATION AND DEFENDANT — KNEW — MISREPRESENTATION |
| DEFENDANT — KNEW — MISREPRESENTATION | ASK YES—NO "DID HE TELL YOU ANYTHING THAT WASN'T TRUE?" |
| | ASK YES—NO "DID HE KNOW IT WASN'T TRUE WHEN HE TOLD YOU?" |
| DETRIMENTAL — RELIANCE | RELIANCE — BY — PLAINTIFF AND LOSS — BY — PLAINTIFF |
| RELIANCE — BY — PLAINTIFF | ASK YES—NO "DID YOU DO ANYTHING DIFFERENTLY BECAUSE OF WHAT HE TOLD YOU?" |
| LOSS — BY — PLAINTIFF | ASK YES—NO "DID YOU LOSE ANYTHING DUE TO THE MISREPRESENTATION?" |

FIG. 4

WILL-TITLE
    FRAGMENT   LAST WILL AND TESTAMENT — FRAGMENT } FRAGMENT
    TERM 1003                                  TEXT 1005  1002

1009:
                MERGE TERM 1007
    1003               1007    1007 1007
REVOKE-PRIOR-WILL Client of client-address, City, State, make this my will. I   }1002
revoke any other wills or amendments to wills made by me.
                                              1005

1009:    1003
DIST-TITLE        1005
Article      Distribution of My Estate.                }1002

:    1003
DIST-TANG-PROP-WITH-DIST/SALE      I give my tangible personal property
(other than items held or used principally in connection with any business enterprise) to
my spouse, Spouse-name, if SPOUSE-PRONOUN survives me. If my spouse does
not survive me, I give such tangible personal property in as nearly equal shares as
practicable to my children who survive me and to the descendants collectively of each
child of mine who predeceases me, such descendants to take the deceased child's
share, per stirpes; provided that my [Executor] may sell any articles of such tangible
personal property that my [Executor] may deem appropriate for distribution in kind and   }1002
add the proceeds to my residuary estate. I suggest that my [Executor] consider any
memorandum I may leave regarding distribution and sale of items of tangible personal
property. All expenses incurred in delivering my tangible personal property and all
expenses of storing and insuring such property pending distribution shall be paid as a
cost of administering my estate. Tangible personal property includes stamp or coin
collections but does not include other money or stock certificates or other evidences of
intangible rights or interests.
:

DIST-TANG-PROP-WITH-GIFT     I give any TANG-PROP-GIFT which I may own at
my death to TANG-PROP-BENEFICIARY if TANG-PROP-BENEF-PRONOUN survives
me.

I give my tangible personal property not otherwise disposed of to my spouse,
Spouse-name, if SPOUSE-PRONOUN survives me. If my spouse does not survive
me, I give such tangible personal property in as nearly equal shares as practicable to   }1002
my children who survive me; provided that my [Executor] may sell any articles of such
tangible personal property that my [Executor] may deem inappropriate for distribution in
kind and add the proceeds to my residuary estate. Tangible personal property includes
stamp or coin collections but does not include other money or stock certificates or other
evidences of intangible rights or interests.
:

TEMPLATE 1001

FIG. 10

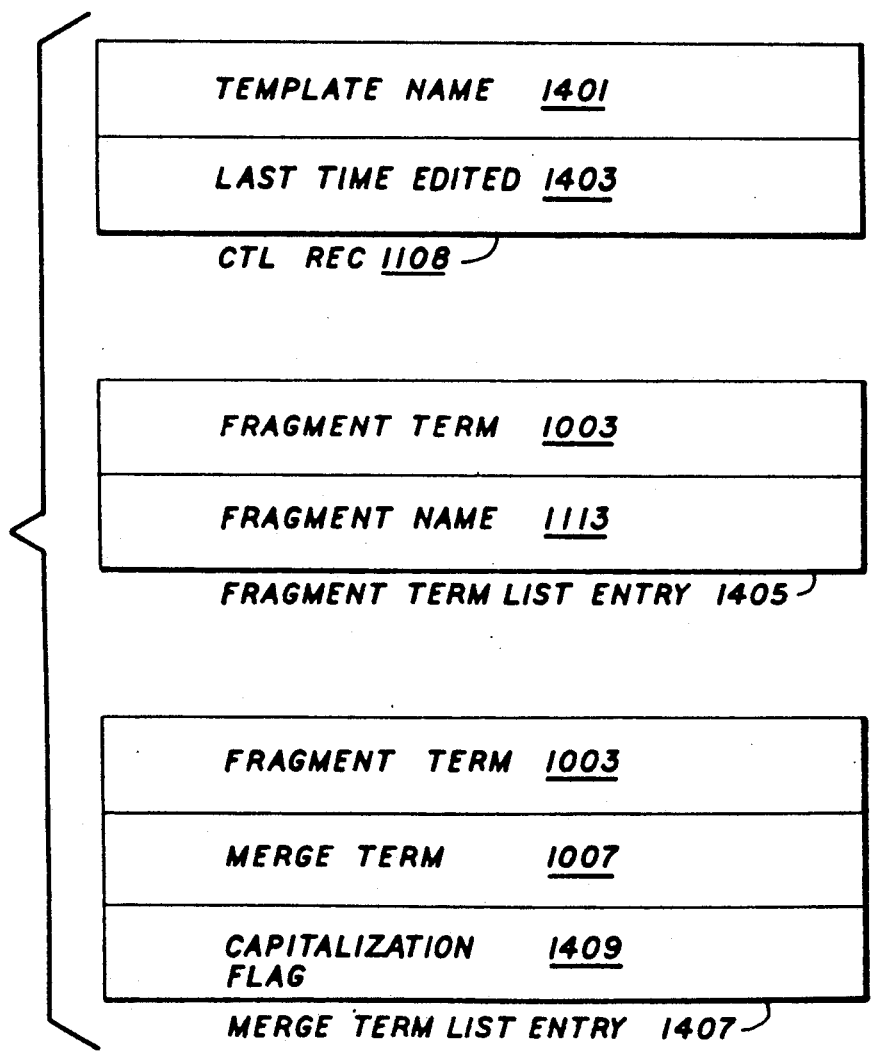

DOCUMENT GENERATION APPARATUS AND METHODS

CROSS-REFERENCES TO RELATED APPLICATIONS

This application is a continuation-in-part of U.S. Ser. No. 371,434, filed 6/5/89, now U.S. Pat. No. 4,967,368 which in turn is a continuation-in-part of U.S. Ser. No. 030,250, filed 3/24/87, now U.S. Pat. No. 4,916,633 which itself is a continuation of U.S. Ser. No. 766,860, filed 8/16/85, now abandoned. The additional disclosure of the present application begins at Section 23 of the Description of a Preferred Embodiment and includes new FIGS. 10-14.

BACKGROUND OF THE INVENTION

1. FIELD OF THE INVENTION

The present invention relates to document generation systems implemented by means of digital computers and more particularly to document generation systems employing expert systems and to the knowledge base and inference engine components of expert systems.

2. Prior Art

Many business and legal documents are "written" by combining pieces of pre-existing text (often called "boilerplate" a required by the situation for which the document is being written and then adding to or editing the result, again as required by the situation. Many documents involving boilerplate were formerly produced rising forms from form books. The form's text contained the information which did not vary from transaction to transaction, while blanks were left for varying information.

With the development of text editing programs (generally termed "editors") for computers, it became possible to automate the form book. The originator of the form provided a template document which was stored in the computer, and people using the editor to make documents which used the form simply copied the template document into the document they were making and then filled in the missing information. The automation rapidly went beyond making a template document and copying it, and a class of systems called document generation systems emerged. A document generation system employs a template document and information provided interactively or from a data base to generate a document which is specifically tailored to the situation for which it is assembled. A survey of such systems may be found in the following article:

James A. Eidelman, "The Computer as Electronic Form Book, Available Software Tools", *Legal Economics*, May-June 1988

Various approaches have been taken to document generation. Some editing programs have macro languages, which permit the user to write programs executed by the editor. By including such a program with a template document, the template document became a document generation system. Other document generation programs separate the program which uses the template from the template. Some document generation systems even employ expert systems with knowledge bases. The information in the knowledge base is used to determine what questions should be asked the person for whom the document is being prepared and to determine to determine what information should be included in the document being generated.

A persistent problem in the design of document generation systems has been achieving power without undue complexity. Powerful document generation systems generally required that the person designing the system have a programmer's skills; document generation systems which did not require such skills often did little more than permit the user to select among parts of the template. In the case of document generation systems using expert systems, a particular problem has been the integration of the expert system which provided the information needed to produce the document with the editor which actually produced it. The foregoing and other problems are solved by the document generation apparatus and methods disclosed herein.

SUMMARY OF THE INVENTION

The document generation apparatus of the present invention is an expert system for generating an output document. The system includes a template document, a knowledge base for storing knowledge base items, an editor for editing the template document and an output document produced by the document generation apparatus, a knowledge base definer for defining knowledge base items in the knowledge base, and an inference engine which responds to inputs of information by using the knowledge base to produce an expert response based on the information. The knowledge base includes a document portion definer which responds to first user inputs to define a document portion knowledge base item which is associated with a portion of the document template. The document portion definer provides the editor to the user to edit the portion and associate the edited portion with the document portion knowledge base item. The inference engine includes an output document generator which responds to a document portion knowledge base item by employing the editing means to provide the document portion associated with the document knowledge base item to the output document when the document knowledge base item and the second user inputs so require.

In another aspect of the invention, the expert system of the invention is a definition-based expert system of the type disclosed in the parents of the present application and the document portions are associated with terms defined in the definition-based expert system's knowledge base. The portions in the template document may further contain other terms defined in the definition-based expert system's knowledge base, including other terms associated with document portions. When the output document generator encounters such a term, the output document generator obtains the term's present value from the knowledge base and outputs the output document with the value in the place of the term. Further, when the user of the document portion definer has finished defining a portion of the template document, the document portion definer determines whether the other terms in the portion have definitions in the knowledge base; if they do not, the knowledge base definer asks the user to provide a definition.

It is thus an object of the invention to provide improved apparatus and methods for generating documents.

It is another object of the invention to provide improved document generation apparatus and methods which employ expert systems.

It is a further object of the invention to provide document generation apparatus and methods which employ definition-based expert systems.

It is an additional object of the invention to provide a definition-based expert system in which a term may be defined as a portion of text and the portion of text may itself include terms defined in the definition-based expert system.

BRIEF DESCRIPTION OF DRAWINGS

FIG. 1A is a conceptual block diagram of a prior art expert system shell.

FIG. 4 is a diagram of the terms and descriptions used to define the term FRAUD.

FIG. 10 is an example template document used in the document generation apparatus.

FIG. 13 is a diagram showing a merge term attribute in the document structure.

FIG. 14 is a diagram of the index employed in the document generation apparatus.

Figure 1:
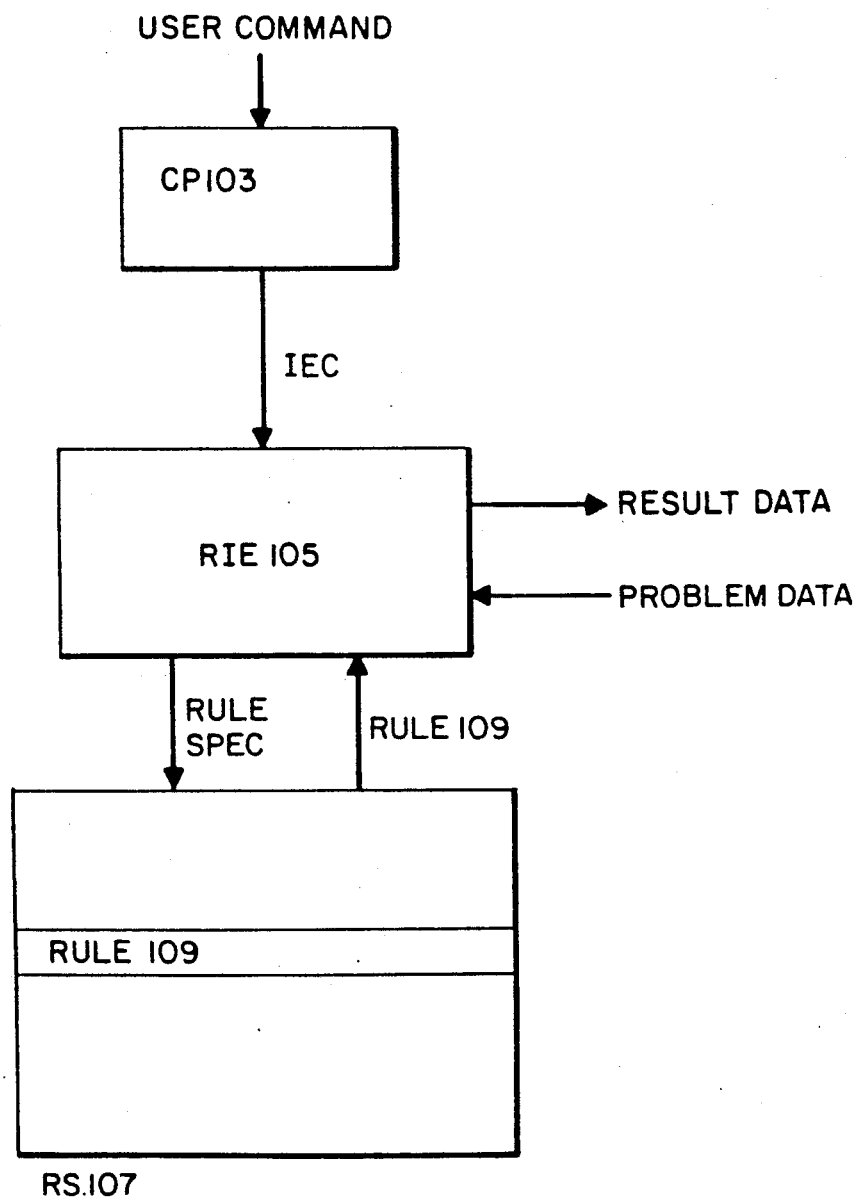
FIG. 1 is a conceptual block diagram of a prior art expert system.

For ease of reference to figures, the reference numbers used in the description of the preferred embodiment have three digits. The two least-significant digits are reference numbers within a drawing; the most significant digit is the drawing number. For example, the reference number 901 refers to an item shown in FIG. 9.

DESCRIPTION OF A PREFERRED EMBODIMENT

The following description of a preferred embodiment first presents a conceptual overview of the expert system and expert system shell of the present invention and then presents a detailed description of a first prototype implementation of the invention. Certain improvements made in a second prototype implementation are discussed. Material added to this disclosure in the present continuation in part begins at Section 23.

Figure 2:
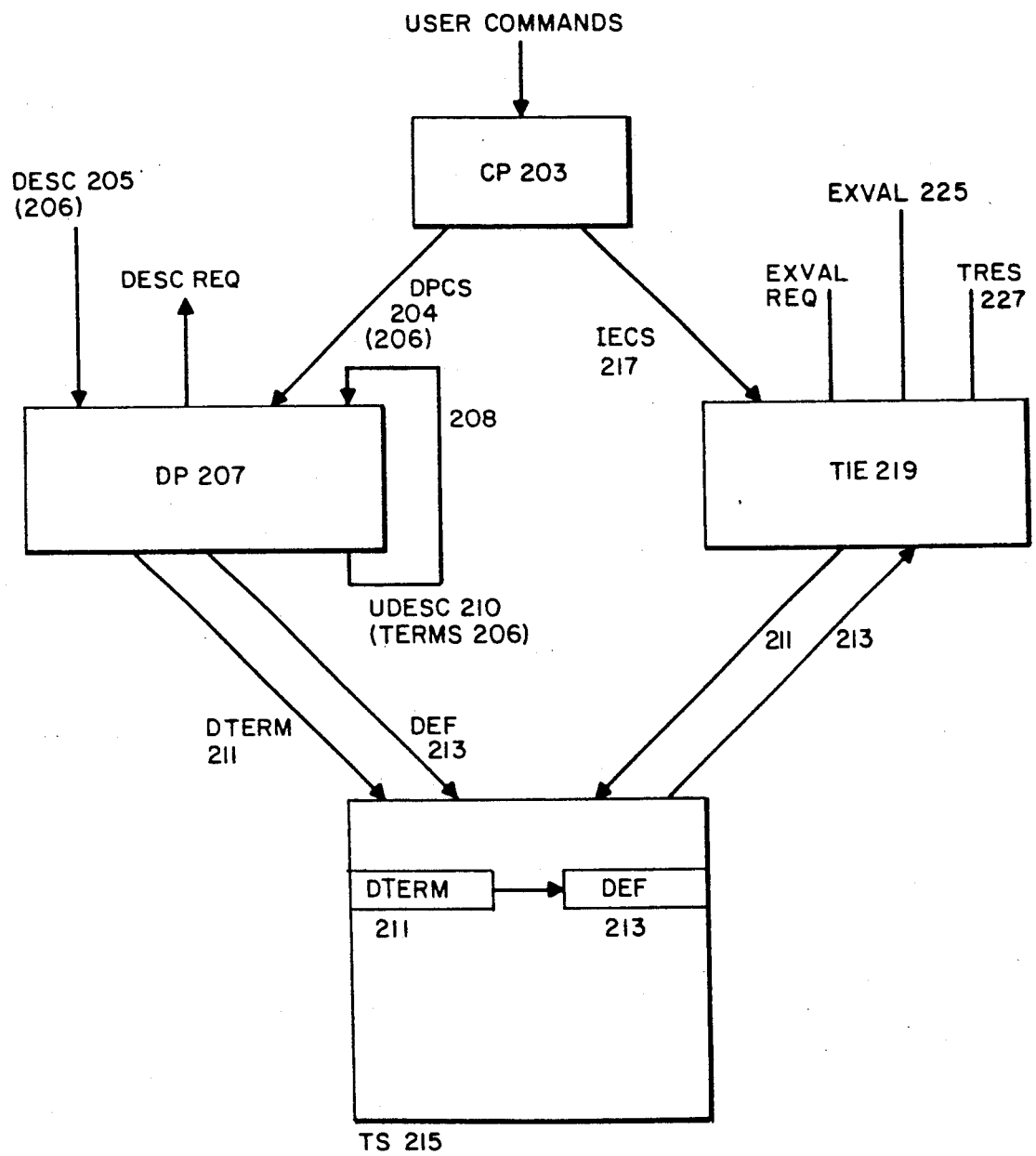
FIG. 2 is a conceptual block diagram of the expert system shell and expert system of the present invention.

1. Conceptual Overview of the Expert System Shell and Expert System of the Present Invention: FIG. 2

FIG. 2 is a conceptual block diagram of expert system shell 201 and expert system 202 of the present invention. Expert system shell 201 has four components: command processor (CP) 203, definition processor (DP) 207, term store (TS) 215, and term inference engine (TIE) 219. Expert systems 202 produced using expert system shell 201 have all of these components but DP 207. As will be explained in more detail below, CP 203 receives commands from users of shell 201 and system 202 and provides them to the other components; DP 207 processes definitions; TS 215 stores defined terms and their definitions; TIE 219 uses a term's definition from TS 215 to evaluate the term and perform other operations on it.

CP 203 converts commands from users of shell 201 and expert systems 202 into definition processor commands (DPCs) 204 and inference engine commands (IECs) 217. In the prototype, DPCs 204 permit the user of shell 201 to define a term, redefine a term, undefine a defined term, view a term's definition, save a set of definitions, and restore a set of definitions. IECs 217 permit the user of shell 201 or an expert system 202 produced by shell 201 to determine the current value of a term, find out how expert system 202 reached that value, have expert system 202 assume a different value for a term and see how that affects the value of other terms, reset the value of any one or all of the terms, and when the determination of the current value of a term requires a value to be supplied from outside the definition, to ask expert system 202 why the value is required.

Definition processor 207 defines TERMs 206. When a TERM 206 has been fully defined, TS 215 contains a defined term (DTERM) 211 corresponding to TERM 206 and a definition (DEF) 213 for DTERM 211. TERM 206 may be received either in a DPC 204 or from a description (DESC) 205 DP 207 requested from the user of expert system shell 201 in response to a TERM 206. DP 207 first determines whether there is already a DTERM 211 corresponding to TERM 206, i.e., whether TERM 206 is already defined. If it is, DP 207 retrieves DTERM 211 corresponding to TERM 206 from TS 215 and prepares it for use in the definition DP 207 is currently constructing. If it is not defined, DP 207 outputs a description request (DESC REQ) to the user of shell 201. The user provides a description (DESC) 205 of TERM 206 to DP 201, which then makes a DEF 213 for TERM 206 using the information in DESC 205. As will be described in more detail below, DESC 205 is written in a definition language which permits the user to specify other TERMs 206, constant values, and that a value is to be obtained from outside expert system 206 for which the definition is being provided. The definition further specifies operations which may be performed on the values represented by TERM 206, constants, and external values in the definition. If DESC 205 contains TERMs 206, DP 207 treats those TERMs 206 in the manner just described. If there is a DTERM 211 corresponding to TERM 206, DTERM 211 is used in DEF 213 being constructed; if there is not, DP 207 requests a DESC 205 defining TERM 206 and processes it as just described. The repetitive operation of DP 207 is shown in FIG. 2 by arrow 208 showing how UDESC 210, which contains at least one TERM 206, is again processed by DP 207. Processing continues in this fashion until the original DESC 205 and all of the TERMs 206 in any DESCs 205 produced for TERMs 206 required to define the TERMs 206 in the original DESC 205 have been defined, i.e, have corresponding DTERMs 211 and DEFs 213 in TS 215.

The DTERMs 211 and DEFs 213 resulting from operation of DP 207 are placed in TS 215. DTERM 211 may be located in TS 215 by name. DEF 213 corresponding to DTERM 211 is associated with DTERM 211, and may thus be used once DTERM 211 is located. Included in DEF 213 is a modified version of DESC 205 from which DEF 213 is derived.

The remaining operations specified by DPCs 204 are carried out in DP 207 and TS 215 as follows: when a TERM 206 is undefined, DP 207 removes the corresponding DTERM 211 and DEF 213 from TS 215; when a TERM 206 is redefined, DP 207 removes DEF 213 corresponding to TERM 206 and requests a new DESC 205 for TERM 206. That DESC 205 is then processed in the manner just described. When a DPC requests that a TERM 206's definition be displayed, DP 207 displays the DESC 205 which was incorporated into the DEF 213 for DTERM 211 corresponding to TERM 206. Finally, the save operation saves the contents of a given TS 215 to a file for later use and the restore operation restores the contents of the file to TS 215.

Term inference engine (TIE) 219 performs operations using the DTERMs 211 and DEFs 213 in TS 215. The primary operation is the what operation, which determines the value of a DTERM 211 from its definition and external values provided by the user of expert system 202 or shell 201. TIE 219 performs the what operation in response to an IEC 217 specifying the operation and a TERM 206 from CP 203. TIE 219 uses DTERM 211 corresponding to TERM 206 to locate DTERM 211's DEF 213 in TS 215. It then performs the operations specified in DEF 213 using the DTERMs 211, constants, and external values specified in the definition and returns the result, TRES 227, to the user of system 202 or shell 201.

The constants in DEF 213 are available for immediate use in calculating the value of DTERM 211; in the case of the external values, DTERM 211 contains a description of how the external value is to be obtained. TIE 219 uses the description to make a request for an external value (EXVAL REQ) to the source of the external value EXVAL) 225 and receives EXVAL 225 from the source. In the simplest case, the source is the terminal being used by the user of system 202 or shell 201 and the information is obtained by putting a question on the user's terminal screen and receiving his input; in more complex cases, the source may be a file or a data base.

In the case of a further DTERM 211 in DEF 213 for the DTERM 211 being evaluated. TIE 219 obtains the further DTERM 211's DEF 213 and computes that DTERM 211's value from its DEF 213, evaluating as it does so any DTERMs 211 in that DEF 213, and continuing thus until all DTERMs 211 from which the DTERM 211 whose value is being sought in the what operation is dependent have been evaluated. The constants, external values, and DTERMs 211 specified in each DEF 213 are dealt with in the manner just described. When all DEFs 213 have been evaluated the value of DTERM 211 whose value is being sought is computed and returned as TRES 227.

In a preferred embodiment, EXVALs 225 which are obtained during evaluation of a given DEF 213 become part of that DEF 213's definition; thus, if the what operation is performed a second time on DTERM 211, TIE 219 will not produce any EXVAL REQs, but will simply use the stored EXVALs 225 to recompute the value of DTERM 211. A preferred embodiment has two IECs 217 for modifying the stored EXVALs 225. The first, reset, simply removes all of the stored EXVALs 225 from the DEFs 213 for the DTERMs 211 specified in the reset command. Thus, when what is again performed, a new EXVAL 225 will be obtained as previously explained. The second, assume, permits a new EXVAL 225 to be provided to DEF 213 for TERM 206 specified in the assume command. When what is again performed in this case, the specified EXVAL 225 is used to derive the value of DTERM 211 for which the what operation is being performed.

If a user of shell 201 or system 202 wants to know, why TIE 219 is asking for a given EXVAL 225, he can respond to an EXVAL REQ with the command for the why operation. In response to that command, TIE 219 outputs DESC 205 from DEF 213 for the DTERM 211 whose value was being computed when the EXVAL 225 was required, and the user can determine from DESC 205 why the given EXVAL 225 is important. The user can further use why to ask why any of the DTERMs 211 whose values are required to obtain the value of the DTERM 211 whose evaluation produced the EXVAL REQ are required, and TIE 219 provides the DESCs 205 for those DTERMs 211.

Figure 3:
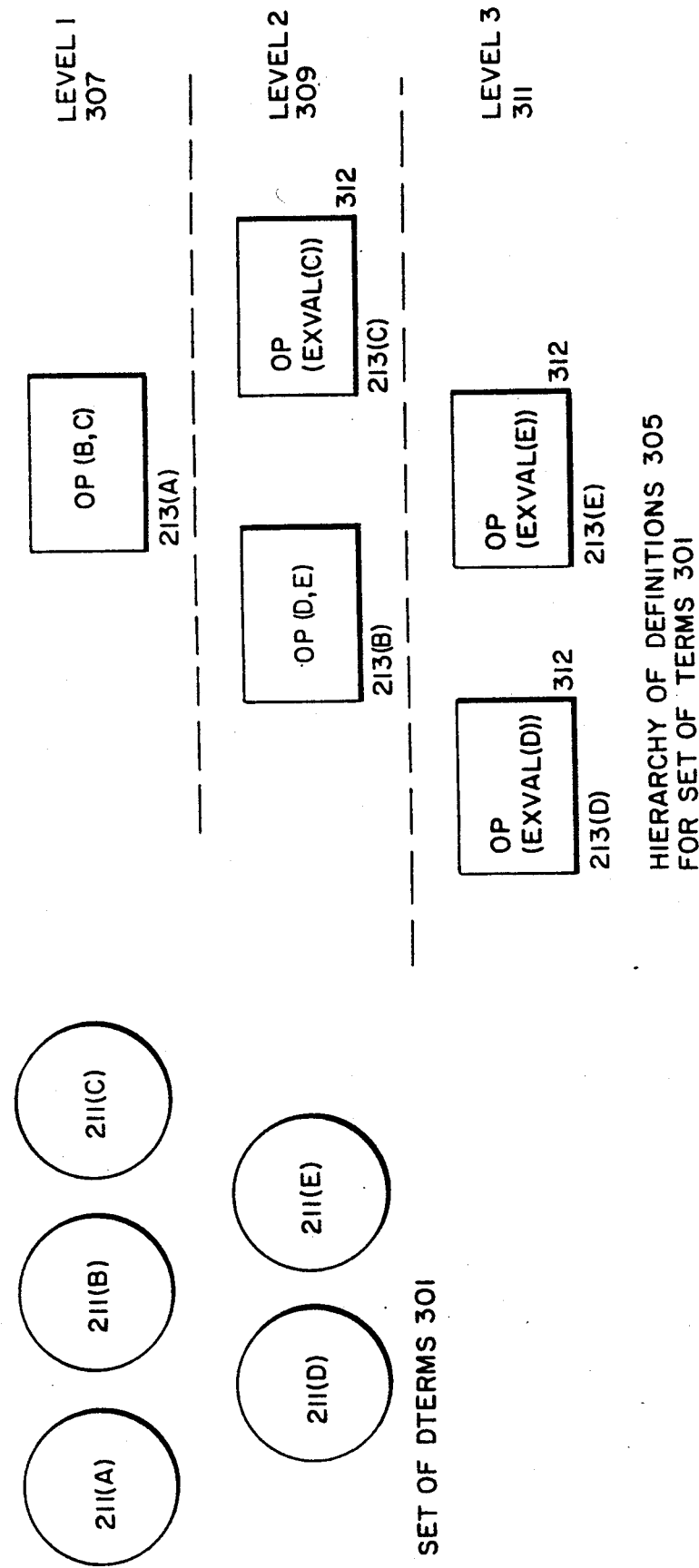
FIG. 3 is a conceptual diagram of a hierarchy of definitions as used in the present invention.

3. The Hierarchy of Definitions: FIG. 3

In defining any term, DP 207 produces a hierarchy of DEFs 213. If DEF 213 for the term being defined itself contains no terms, the hierarchy has only one level. If DEF 13 for the term contains a further term, that term must be defined before the first term can be defined, and the first term is the top term in a hierarchy with two levels. If any of the DEFs 213 at the second level contains a further term, that term must be defined, and the hierarchy has three levels. The hierarchy thus continues to deepen until none of the DEFs 213 for the terms upon which other terms depend contains a further term, but is instead defined solely in terms of operations on constants or external values. As is clear from the above discussion, a DEF 213 is always the top DEF 213 in the hierarchy of DEFs 213 required to define the DTERM 211 which DEF 213 defines, but may at the same time be at a lower level in the hierarchy of DEFs 213 required to define some other DTERM 211.

FIG. 3 is a conceptual illustration of one such hierarchy of DEFs 213. Hierarchy 305 contains DEFs 213(A) through 213(E) corresponding to DTERMS 211(A) through 211(E) belonging to set of DTERMS 301. The topmost definition in hierarchy 305 is DEF 213(A), corresponding to DTERM 211(A). The notation OP(B,C) in DEF 213(A) indicates that DEF 213(A) specifies that the value of DTERM 211(A) is obtained by performing an operation on the values of DTERMs 211 (B) and (C). Similarly, DEF 213 B specifies that the value of DTERM 211(B) is obtained by performing an operation on the values of DTERMs 211(D) and (E). Consequently, hierarchy 305 for DEF 213(A) has three levels: level 1 307, containing only DEF 213(A), level 2 309, containing DEF 213(B) and DEF 213(C), and level 3 311, containing DEFs 213(D) and 213(E). DEFs 213(C), 213(D), and 213(E) do not define DTERMs 211 C, D, and E with other DTERMs 211, and cannot give rise to lower levels. Such DEFs 213 are termed terminal definitions 312.

In constructing hierarchy 305 DP 207 begins with TERM 206(A) corresponding to DTERM 211(A), which it receives from a DESC 205 from which a DEF 213 at a higher level is being constructed or from a define or redefine DPC 204 DP 207 then requests a DESC 205 for DTERM 211(A). DESC 205 defines DTERM 211(A) in terms of an operation on two TERMS 206, B and C. If DEF 213(B) and DEF 213(C) already exist, DP 207 can make DEF 213(A) and need go no further. If either DEF 213(B) or DEF 213(C) does not exist, DP 207 must produce those DEFs 213 before it can make DEF 213A. DP 207 thus asks for a DESC 205 for TERM 206(B) and for TERM 206(C). In the case of TERM 206(C), DESC 205 defines TERM 206(C) only in terms of EXVAL(C) 225, and DEF 213(C) can be constructed immediately. In the case of TERM 206(B), DESC 205 defines TERM 206(B) in terms of two additional TERMs 206, D and E; consequently, DP 207 must descend another level and produce DEFs 213 for those TERMs 206. Again, DP 207 requests DESCs 206 for those terms. In both cases, the TERMs 206 are defined in terms of EXVALs 225, and consequently, both DEFs 213 can be constructed. DEFs 213 for all TERMs 206 involved in the definition of TERM 206 A have now been constructed, DTERMs 211(B) through (E) corresponding to TERMs 206 (B) through (E) exist, DEF 213(A) can be constructed, and TERM 206(A) now has a DTERM 211(A) corresponding to it.

Because hierarchy 305 is constructed repetitively beginning with the top DEF 213 in hierarchy 305 and only TERMs 206 which have no corresponding DTERM 211 are defined, no DTERM 211 can have two DEFs 213 and no DEF 213 in hierarchy 305 can refer to a DEF 213 which is above it in hierarchy 305. Consequently, the DEFs 213 in hierarchy 305 are necessarily complete and consistent with regard to DEF 213(A) in hierarchy 305 or to the top DEF 213 in any hierarchy incorporating DEF 213(A).

4. The Description Language for Descriptions 205

As previously indicated, DP 207 makes DEFs 213 from descriptions (DESCs) 205. In the prototype, DESCs 205 are made using a description language. The description language includes predefined terms specifying operations on terms, a case statement, and operations for obtaining external values.

The operations include Boolean operations, arithmetic operations, and text concatenation. The case statement is a list of boolean expression-value pairs of the form:

```
(boolean_exp_1) value 1 . . . (boolean_exp_n) value_n
(OTHERWISE) otherwise_value
```

When DEF 213 containing a case statement is evaluated, the boolean expressions 1 through n are evaluated in order until one of them is true. The value corresponding to the true boolean expression becomes the value of DTERM 211 defined by DEF 213. If none of the boolean expressions is true, the value corresponding to OTHERWISE becomes the value of DTERM 211.

The description language of the prototype permits specification of two classes of operations for obtaining external values. The first class, the ASK operations, obtains values from the terminal of the user of expert system 202. The first class, the ASK operations, are used to obtain external values from the terminal. The second class, the RECORD operations, are used to obtain external values from a data base system. In both cases, the external values may be numbers, text strings, or boolean values, or they may select one of a set of alternative literal terms, i.e., terms which represent nothing but themselves.

ASK to obtain a numeric value has the form:

```
ASK NUMBER "prompt_string"
```

When the DEF 213 containing such an ASK operation is evaluated, DP 207 outputs the prompt string to the terminal and waits for a number input from the terminal. That number is then used in the evaluation of DEF 213. The prompt string ma itself contain a previously-defined term, and consequently, a user's response may be made to depend on the value of a previously-evaluated term. The ASK operations for boolean and text string values are specified in the same fashion as the ASK operation for numeric values, except that NUMBER in the above operation is replaced by YES-NO when a boolean value is sought and TEXT when a text string is sought.

ASK which selects one of a number of literal terms has the form:

```
ASK CHOICE "prompt_string"
        (literal_term_1 . . literal_term_n)
```

When the DEF 213 containing ASK CHOICE is evaluated, the prompt string is output and the user is asked to select one of the literal terms. That literal term may then be used in DEF 213 to compute the value of DTERM 211 defined by DEF 213.

The RECORD operations are generally analogous to the ASK operations, except that the RECORD operation specifies how the external value is to be located in the data base and the data base supplies the value at the specified location.

5. Operation of Shell 201 and System 202: FIG. 4

The operation of shell 201 will be explained in detail using a hierarchy of definitions from which it may be determined whether someone has been defrauded. The legal definition of fraud requires that one party knowingly made a misrepresentation to the other party and that the other party relied on the misrepresentation to his detriment. FIG. 4 shows a hierarchy of DTERMs 211 which corresponds to that legal definition.

Creation of the hierarchy of FIG. 4 begins when CP 203 receives the DEFINE FRAUD command. CP 203 then passes TERM 206 FRAUD to DP 207, which requests a DESC 206 from the expert making the definition. The expert provides the DESC 206

```
KNOWING_MISREPRESENTATION AND
    DETRIMENTAL_RELIANCE
```

This DESC 206 contains two further TERMs 206 and the boolean AND operator. Thus, the value of FRAUD is to be computed by obtaining the values of the DTERMs 211 corresponding to the TERMs 206 and performing an AND operation on them.

Since the further TERMS 206 are undefined, DP 207 asks for their definitions. The expert provides the DESC 205

```
MISREPRESENTATION AND
    DEFENDANT_KNEW_MISREPRESENTA-
    TION
```

KNOWING_MISREPRESENTATION and the DESC 205_RELIANCE_BY PLAINTIFF AND LOSS_BY_PLAINTIFF for DETRIMENTAL_RELIANCE. Again, these further TERMs 206 are undefined, so DP 207 asks for their definitions and the expert provides the definitions show in FIG. 4. While DP 207 may ask for definitions in any order, a preferred embodiment defines all TERMs 206 necessary to define a given undefined TERM 206 before going on to the next undefined TERM 206.

In the above example, the DESCs 205 for MISREPRESENTATION, DEFENDANT_KNEW_MISREPRESENTATION, RELIANCE_BY_PLAINTIFF, and LOSS_BY_PLAINTIFF all contain only the system-defined DTERMS 211 used in the ASK YES-NO operation, so DP 207 is now able to produce DEFs 213 for all of the terms in the hierarchy. The values of all of the DTERMs 211 in the hierarchy depend ultimately on the values which the ASK YES NO operation requests from the user of expert system 202 which employs the FRAUD definition, and thus depends ultimately on what the plaintiff says about what happened to him.

Use of the FRAUD definition hierarchy in expert system 202 begins with the WHAT FRAUD command which the user of expert system 202 inputs to CP 203 CP 203 generates a corresponding WHAT FRAUD IEC 217 for TIE 219. TIE 219 then determines the value of FRAUD by evaluating its DEF 213. In order to do that, it must evaluate the DEFs 213 for other DTERMs 211 in the hierarchy, beginning with KNOWING_MISREPRESENTATION. The evaluation of KNOWING_MISREPRESENTATION requires the evaluation of MISREPRESENTATION. The evaluation of that DTERM 211 results in the execution of the WHAT YES-NO operation in its DEF 213, and TIE 219 outputs the prompt "Did he tell you anything that wasn't true?" If the user answers "no", MISREPRESENTATION is false, KNOWING_MISREPRESENTATION is false, and FRAUD is false, so TIE 219 returns TRES 227 to the user indicating that there is no fraud. If the user answers "yes", TIE 219 evaluates DEFENDANT_KNEW_MISREPRESENTATION, which again results in a question to the user. Depending on the answer to the question, evaluation continues or is finished. TIE 219 proceeds in the above fashion until it has computed a value for FRAUD.

As previously mentioned, a user of expert system 202 may use the HOW user command to determine how expert system 202 arrived at its value for FRAUD. Assuming that the user answered "no" when asked "Did he tell you anything that wasn't true" (in the definition of MISREPRESENTATION), TIE 219 in the prototype will respond to HOW FRAUD by outputting FRAUD is defined to be (KNOWING_MISREPRESENTATION AND DETRIMENTAL_RELIANCE) where (KNOWING_MISREPRESENTATION) equals FALSE.

As previously mentioned, DP 207 places DESC 205 for a DTERM 211 in the DTERM 211's DEF 213, and TIE 219 also stores the external values it receives in evaluating a DTERM 211's DEF 213 in DEF 213. In performing the HOW operation, TIE 219 first fetches and outputs DESC 205 from DEF 213 for the DTERM 211 being inquired about and then evaluates the DTERMS 211 in DEF 213 as required to obtain the value of DTERM 211 being inquired about. The DTERMs 211 are then output together with their values. If a user wishes to inquire further, he need only repeat the HOW operation on the other DTERMS 211 specified in the DESC 205 output in the HOW operation.

As also previously mentioned, a user may respond to a request for an external value with the WHY command instead of a value. If a user responds in the case of the FRAUD example with WHY when TIE 219 asks "Did he tell you anything that wasn't true", TIE 219 responds with:

MISREPRESENTATION is needed to determine the value of KNOWING_MISREPRESENTATION, which is defined to be MISREPRESENTATION AND SUBJECT_KNEW_MISREPRESENTATION and repeats the question.

Again, the information used to respond to the WHY command comes from the DESCs 205 stored in the DEFs 213 in the hierarchy used to define FRAUD. If the user wants to know more at this point, he can apply HOW to the DTERMs 211 mentioned in the response to the WHY command.

Figure 5:
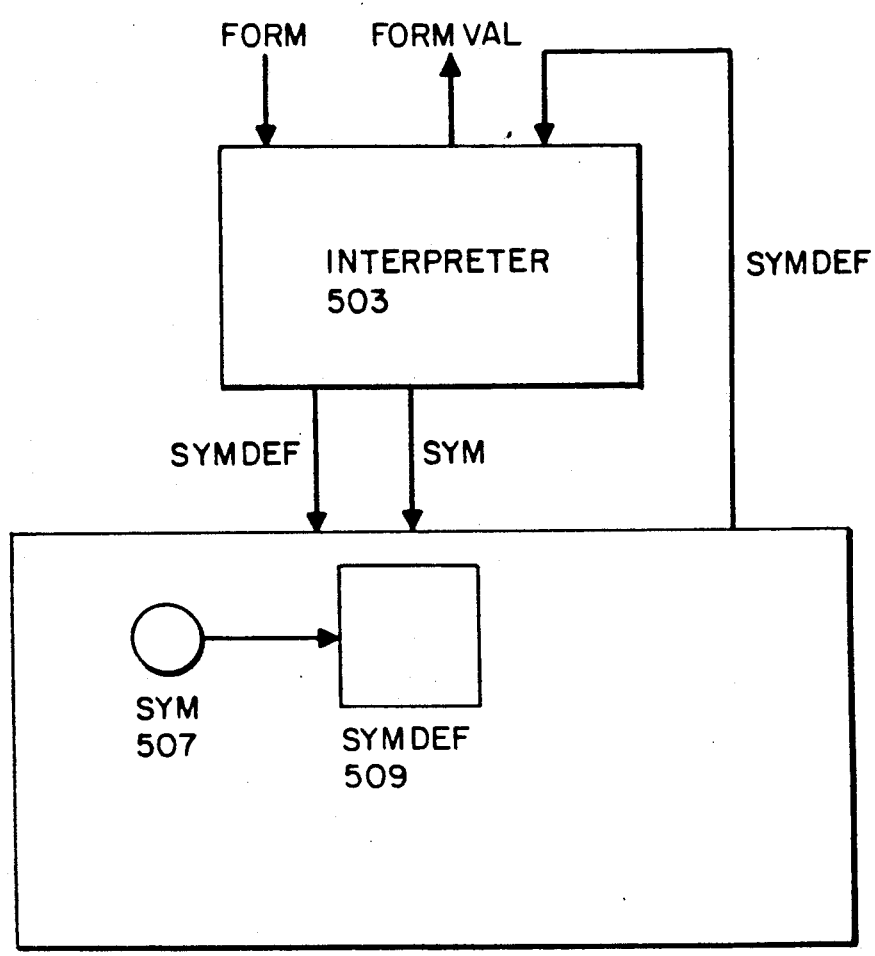
FIG. 5 is a diagram of a LISP environment.

6. The LISP Environment of the Prototype Embodiments: FIG. 5

Having thus provided a conceptual overview of the structure and operation of shell 201 and system 202, the discussion proceeds to a detailed description of the implementation of the first prototype.

Both the first and second prototype embodiments are implemented in the LISP programming language and execute in the LISP environment. The LISP programming language and environment are frequently used to implement prototype and production expert systems and are well-known in the expert system art. The specific LISP dialect used for the prototype embodiments is COMMON LISP, which is described in Guy L. Steele, Jr., *COMMON LISP, the Language*, Digital Press, 1984. Only so much of the LISP environment and language are described here as is required for a clear understanding of the mode of operation of the prototype embodiments.

Beginning with the LISP language, the language differs from languages such as FORTRAN or PASCAL in that is is chiefly concerned with the processing of symbols, as opposed to the processing of data which is represented in a program by symbols. The fundamental components of a LISP program are atoms. An atom may be a symbol, such as ABC, or a constant. The components are organized into programs by means of lists which may have no members or members including atoms and other lists. A list is made by enclosing its members in parentheses: (ABC) is a list with one member, the symbol ABC. Functions appear in LISP as lists in which the first symbol in the list represents the function and the other atoms represent the function's arguments. For example, the add function is represented in LISP by the symbol +, and the list (+2 3) specifies that the + operation is to be applied to the atoms 2 and 3. Any atom or list which has a value when evaluated by a LISP interpreter is called a form. 5 and (+2 3) are forms, and if the symbol ABC has a value, it is a form.

Functions are defined in LISP by means of the DEFUN function, in which the remaining items of the list define the function's name, its arguments, and the value it returns. For example, (defun five () 5) defines a function which takes no arguments and always returns the value 5.

Among the things LISP programs can do with symbols and lists is make them. Since a function definition is only a kind of list, a LISP program can provide a symbol to DEFUN as the name of the new symbol being created by DEFUN and then use the symbol to execute the newly-created function. Symbols may either represent themselves as symbols or values. When a symbol is representing itself as a symbol in a LISP list, it is preceded by a' mark. In the case of symbols representing functions, the value of the symbol is the function. However, if the function is placed in a list with its arguments and the list evaluated, the result is the value of that execution of the function. Thus, 'five represents the symbol five, while five represents the function defined by DEFUN above, and (five) represents the value of an execution of the function five, i.e., 5.

LISP programs are written and executed in a LISP environment. That used for the prototype embodiments was made by Gold Hill Computers, Inc. for the Professional Computer manufactured by Wang Laboratories, Inc. FIG. 5 is a conceptual block diagram of a typical LISP environment 501. Environment 501 has two main components, LISP interpreter 503, which evaluates LISP forms, and LISP symbol space 505, which stores LISP symbols (SYM 501) and their definitions (SYMDEF 509). DEFUN and certain other LISP functions create and define new LISP symbols or redefine previously-existing LISP symbols when they are evaluated; consequently, LISP interpreter 503 may be seen as not only an evaluator of symbols, but also as a creator, definer, and redefiner of symbols.

Operation of LISP environment 501 is as follows: when a user of LISP environment 501 types a list containing a form such as (five), LISP interpreter 503 evaluates the form by locating the symbol five in symbol space 505, determining what its SYMDEF 509 is, and then interpreting SYMDEF 509 to compute the value of five. In this case, SYMDEF 509 is the code for the function five which was created by evaluation of the DEFUN expression, and its interpretation produces the value 5, which the interpreter returns to the user as the value of (five).

Figure 6:
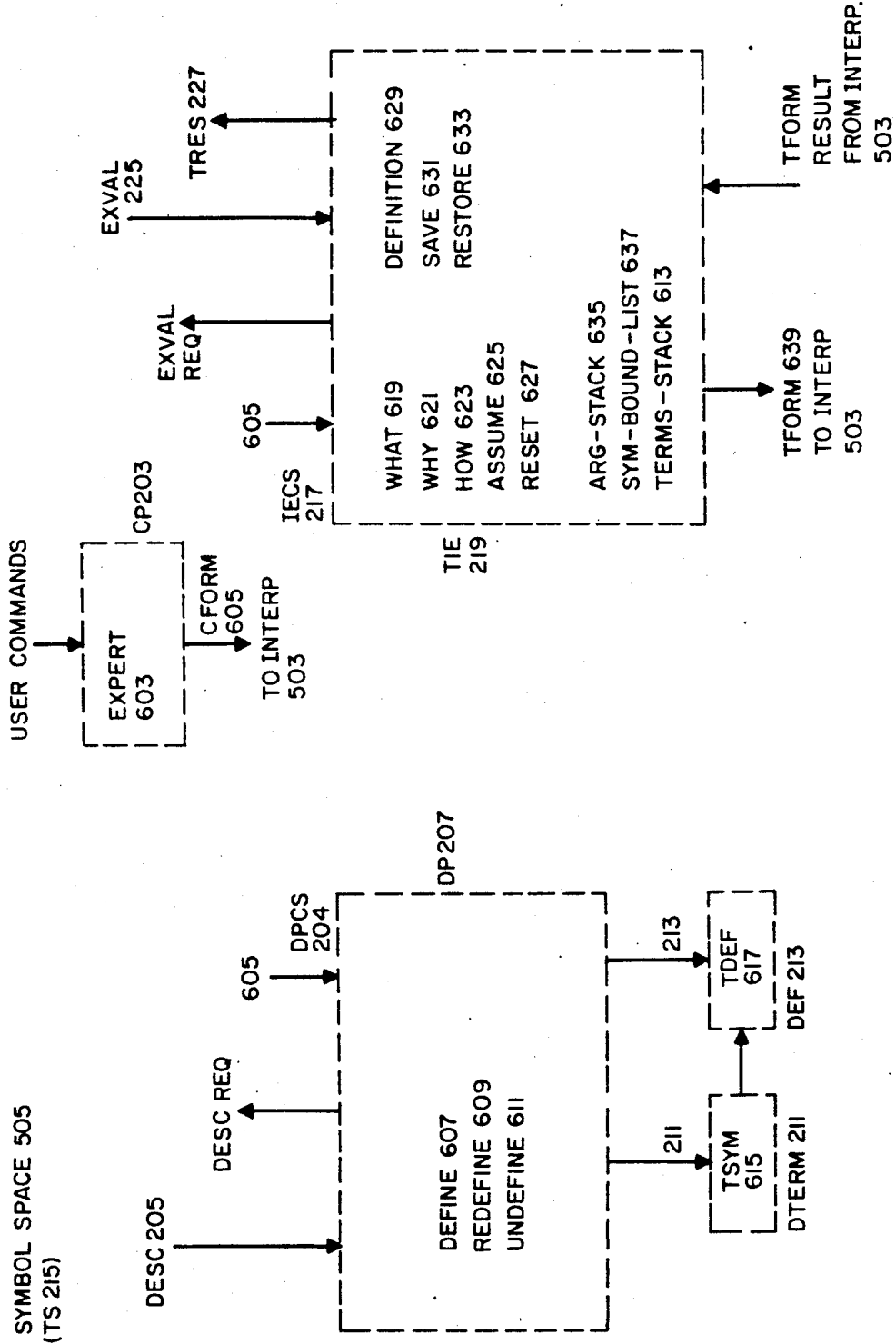
FIG. 6 is an overview of a first prototype embodiment of the present invention.

Because LISP interpreter 503 is able to create SYMs 507 and their corresponding SYMDEFs 509, store them in symbol space 505, and locate them in symbol space 505, LISP environment 501 automatically performs operations which are difficult to implement in other languages and which are essential for the operation of expert system shells and expert systems For that reason, LISP environments 501 have been the preferred environments for the creation of prototype expert systems and expert system shells As will be seen in the ensuing discussion, the prototypes of the present invention take full advantage of the symbol creation, definition, and location operations 7. Overview of the First Prototype Embodiment: FIG. 6

In the first prototype embodiment, the components of expert shell 201 and expert system 202 are implemented by means of LISP functions. FIG. 6 gives an overview of the functions and relates them to the components of FIG. 2 and the inputs and outputs of those components. Thus, the LISP functions making up CP 203 are contained in the dashed box with that label, the functions making up DP 207 are in the dashed box with that label, and those making up TIE 219 are in the dashed box with that label. TS 215 is embodied in the first prototype by LISP symbol space 505, which stores LISP symbols and their definitions. The components of the first prototype embodiment should also be understood to include LISP interpreter 503, which executes the LISP functions making up the components, places the SYMs 507 and SYMDEFs 509 created by the components in symbol space 505, and manipulates the SYMs 507 and their SYMDEFs 509.

Beginning with EXPERT 603, EXPERT 603 performs the functions of CP 203 in the prototype. EXPERT 603 receives an input string, puts parentheses around it to produce a LISP form termed CFORM 605 in FIG. 6, and performs the EVAL operation on it. When LISP interpreter 503 evaluates the form, it treats the first symbol in the form as a LISP function name and the remaining items in the form as a list of arguments for the named function.

Expected input strings for EXPERT 603 are the commands for DP 207, namely DEFINE, REDEFINE, UNDEFINE, and the commands for TIE 219, namely WHAT, HOW, ASSUME, RESET, DEFINITION, SAVE, WHY, and RESTORE. DEFINE, REDEFINE, and UNDEFINE correspond to the DPCs 204 of FIG. 2 and the remaining strings correspond to the IECs 217 of that figure. In the first prototype embodiment, there is no error detection in EXPERT 603; however, in a commercial embodiment, EXPERT 603 would include code for detecting and responding to improper input.

As may be seen from FIG. 6, DP 207 is embodied in the first prototype by the LISP functions DEFINE, REDEFINE, and UNDEFINE. When EXPERT 603 receives the DEFINE command with a TERM 206 such as FRAUD, and presents it to the LISP interpreter as (DEFINE FRAUD), LISP interpreter 503 invokes the function DEFINE with the argument FRAUD. DEFINE requests a DESC 205 from the user and uses DESC 205 to produce the DEF 213 for FRAUD. As will be explained in greater detail below, the result of the invocation is a LISP function named FRAUD for which the DEFUN would look like the following:

```
(defun FRAUD ()
    (prog2
    (push 'FRAUD arg-stack)
    (AND (KNOWING_MISREPRESENTATION)
        (DETRIMENTAL_RELIANCE))
    (pop Arg-stack)
))))
```

In the course of defining FRAUD, KNOWING_MISREPRESENTATION and DETRIMENTAL_RELIANCE and the DTERMs 211 required for their definitions are all defined as LISP symbols representing LISP functions. AND is a predefined LISP function which performs the AND operation on its arguments. The value returned by the function FRAUD is the result of the AND operation.

Figure 7:
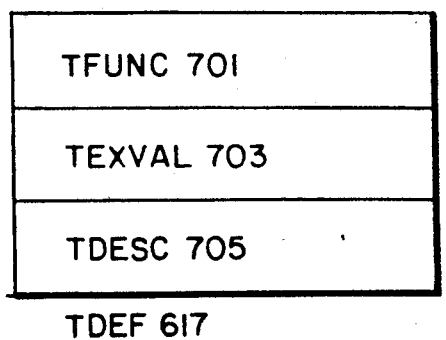
FIG. 7 is a diagram of TDEF 617 of the first prototype embodiment.

The DTERMs 211 which have been defined as LISP symbols representing LISP functions are termed TSYMs 615 in the following discussion, and their definitions, which are the prototype's implementation of DEFs 213, are termed TDEFs 617. As the LISP interpreter produces TSYMs 615 and TDEFs 617 in response to the DEFINE function, it places them in symbol space 505. TDEF 617 in the first prototype is shown in FIG. 7. As shown there, each TDEF 617 contains TFUNC 701, the LISP function represented by TSYM 615, TDESC 705, a modified copy of DESC 205 which was the source of TSYM 615's definition, and TEXVAL 703, which contains the last EXVAL 703 specified by a user of expert 202 for TSYM 615.

The remaining functions in DP 207 are invoked in the same fashion as DEFINE from EXPERT 603. REDEFINE first employs LISP operations which remove TFUNC 701 and TDESC 705 from TDEF 617 for TSYM 615 being redefined and then invokes DEFINE to make new values for TFUNC 701 and TDESC 705 in TDEF 617. UNDEFINE simply removes TFUNC 701 and TDESC 705 without making a new definition of TSYM 615.

Continuing with the implementation of TIE 219 in first prototype embodiment 601, when LISP interpreter 503 receives a CFORM 605 from EXPERT 603 which represents an IEC 217, it executes the function in TIE 219 specified in CFORM 605. As the functions in TIE 219 are executed, they provide forms (TFORMS 639) made from TSYMS 615 to Interpreter 505, which evaluates them and returns the results (TFORM RESULT) to the function being executed.

The functions in TIE 219 employ data structures in TIE 219, ARG-STACK 635, TERMS-STACK 613, and SYM-BOUND-LIST. Beginning with ARG-STACK 635, ARG-STACK 635 is used to store a TSYM 615 while the values of the TSYMs 615 with which it is defined are computed. As may be seen in the code for the procedure FRAUD above, the symbol FRAUD is pushed to ARG-STACK before the AND operation which defines FRAUD is executed and is popped from ARG-STACK thereafter. TERMS-TACK 613 is a stack of TSYMs 615. The stack is ordered by when a TSYM 615's TDEF 617 was created, with the first TSYM 615 to have its TDEF 617 created at the bottom and the last at the top. As will be explained in detail below, the last TSYM 615 is normally the one whose TDEF 617 is at the top of the hierarchy of definitions. SYM_BOUND_LIST 637 is a list of TSYMs 615 which currently have EXVALs 225 assigned to them.

Beginning the discussion of the LISP functions in TIE 219 with WHAT function 619, that function is executed in response to the WHAT command to EXPERT 603. That command has the form WHAT DTERM 611. For FRAUD, it would be WHAT FRAUD, which EXPERT 603 turns into (WHAT FRAUD). WHAT function 619 first uses a LISP function to determine whether its argument is a TSYM 615, and if it is, uses another LISP function which takes a symbol which is a function name as an argument and invokes the function, in this case, FRAUD. The result is the execution of TFUNC 701 in TDEF 617 for FRAUD. When that TFUNC 701 is executed, the TFUNCs 701 for MISREPRESENTATION and DETRIMENTAL_RELIANCE are executed until the value of FRAUD has been determined. When a TFUNC 701 for a given TSYM 615 is executed, the TFUNCs 701 for any TSYMs 615 required to find the value of the given TSYM 615 are executed. When all of the necessary TFUNCs 701 have been executed, the value resulting from those executions is returned to the user of system 202 as TRES 227. If a TSYM 615 whose TFUNC 701 requires an EXVAL 225 already has such a value, the TSYM 615 is on SYM-BOUND-LIST 637 and TFUNC 701 uses TEXVAL 703 in TDEF 617 for TSYM 615; otherwise, TFUNC 701 generates an EXVAL REQ and obtains EXVAL 225 from the user. Thus, the WHAT function, together with LISP interpreter 503, operate as an inference engine for determining the value of the TSYM 615 whose definition is at the top level of the hierarchy as determined by external values. Further, as long as a TFUNC 701 invoked as a consequence of the WHAT operation is active, its corresponding TSYM 615 is on ARG-STACK 635.

HOW function 623 is executed in response to the HOW command, which specifies a TSYM 615. HOW function 623 takes that TSYM 615 as an argument and uses another LISP function, SYMBOL-FUNCTION with the argument TSYM 615 to obtain the list used with DEFUN to define TFUNC 701 corresponding to TSYM 615 and other LISP functions to obtain the third element in the third list in TFUNC 701. As may be seen from the FRAUD function above, that element in the list defining the operation by which the function's value is derived, i.e., in FRAUD, the list (AND (KNOWING_MISREPRESENTATION) (DETRIMENTAL_RELIANCE)). The HOW function retrieves that list, uses TIE 219's DEFINITION function to display TDESC 705 for TSYM 615 used in the HOW command, and then evaluates the TSYMs 615 in the list retrieved from TFUNC 701, and outputs the results with suitable explanatory text.

The user of expert 202 may input the WHY command either to EXPERT 603 or to TIE 219 in response to an EXVAL REQ output during evaluation of a TSYM 615. The WHY function may be invoked either with or without a TSYM 615 as an argument. In the first case, the function works with the TSYM 615 currently at the top of ARG-STACK 635, which is the TSYM 615 corresponding to TFUNC 701 currently being evaluated and whose evaluation produced the EXVAL REQ to which the user may be responding, and in the second case, it works with TSYM 615 provided by the user. In either case, the next step is to locate the preceding TSYM 615 in ARG-STACK 635, which is the TSYM 615 corresponding to the TFUNC 701 whose evaluation led to the evaluation of the function corresponding to TSYM 615 being processed by WHY. If there is no preceding TSYM 615, the WHY command is meaningless, and a corresponding message is output to the user; if there is a preceding TSYM 615, then DEFINITION is used to output the definition for the preceding TSYM 615 together with suitable explanatory text.

Continuing with the DEFINITION function, the command to EXPERT 603 which invokes the function may have either a TSYM 615 as an argument or no argument. In the first case, TDESC 705 in TDEF 617 is output; in the second case, the TDESCs 705 for all TSYMs 615 on TERMS-STACK 613 are output.

The ASSUME function is invoked with the ASSUME command, which specifies a TSYM 615 and a value. The TSYM 615 must be one whose TFUNC 701 requests an EXVAL 225. ASSUME first empties ARG-STACK 635, so that the TSYM 615 will be reevaluated before a WHY command succeeds, then sets TEXVAL 703 in TDEF 617 to the value received as an argument, and puts TSYM 615 on SYM-BOUND LIST 613 to indicate that it has a TEXVAL 703.

The RESET function is invoked with the RESET command, which may or may not specify a TSYM 615. In the first case, only TEXVAL 703 in TDEF 617 corresponding to TSYM 615 is reset; in the second case, all TEXVALs 703 are reset. The RESET function first empties ARG-STACK 635 for the reason previously described. If a TSYM 615 is specified, the RESET function unbinds TEXVAL 703 from TSYM 615, effectively removing it from TDEF 617, and removes TSYM 615 from SYN-BOUND-LIST 637. If no TSYM 615 is specified, RESET performs the above operation for every TSYM 615 on SYN-BOUND-LIST 637

The SAVE function makes a file which contains a DEFINE command for each TSYM 615 followed by TDESC 705 for the TSYM 615. The DEFINE commands occur in the order in which TSYMs 615 occur in TERMS-STACK 613. SAVE works by outputting the following to the file for each TSYM 615 in TERMS-STACK 613: the string DEFINE, a string representing TSYM 615, and a string representing TDESC 705 for TSYM 615. The resulting file contains the TDESCs 705 in the order in which the DESCs 205 upon which they are based were input to DP 207.

The RESTORE function restores the TSYMS 615 which were previously saved. It does so by performing a LISP load operation on the file. In the load operation, the LISP symbols in the file are evaluated. In this case, the result of the evaluation is the production of the TSYMs 615 and their TDEFs 617 specified in the DEFINE commands in the restored file.

Figure 8:
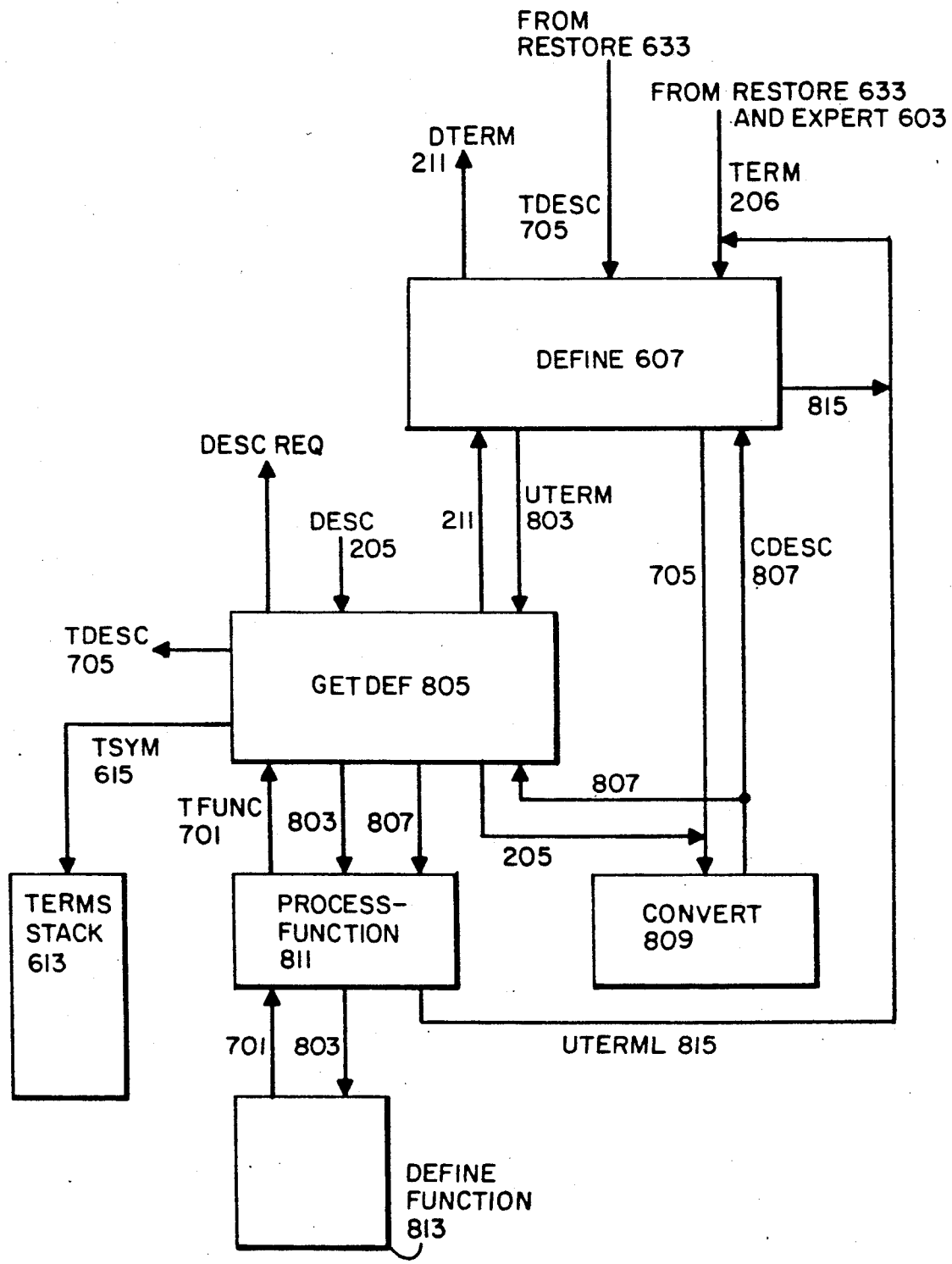
FIG. 8 is a detailed diagram of the function DEFINE of the first prototype embodiment.

10. Detailed Description of DEFINE 607: FIG. 8

FIG. 8 shows how the DEFINE functions and functions invoked by it recursively create the hierarchy of TDEFs 617 for a given set of TSYMs 615. As previously mentioned, the manner in in which DEFINE creates the hierarchy of TDEFs 617 guarantees that each TERM 206 is completely defined and that a given TERM 206 has only a single definition.

FIG. 8 shows DEFINE, the major functions invoked by DEFINE, and the manner in which the data from which TSYMs 615 and TDEFs 617 are created flows between the functions DEFINE 607 produces DTERMs 211 from TERMs 206. When DEFINE returns DTERM 211, TSYM 615 and TDEF 617 corresponding to DTERM 211 have been created. DEFINE 607 is invoked by EXPERT 603 and RESTORE 633; additionally, it is recursively invoked by itself and by PROCESS-FUNCTION 811. EXPERT 603 provides CFORM 605 containing the DEFINE symbol and a TERM 206 to be defined; RESTORE 633 provides a CFORM 605 containing the DEFINE symbol and a TERM 206 which is a copy of a previously-saved DTERM 211 and a copy of TDESC 705 for that DTERM 211. When DEFINE 607 is recursively invoked, its input is a TERM 206 which is is used in the DESC 205 of another TERM 206 being defined.

Generally speaking, TERM 206 is a single symbol; however, when DESC 205 includes a case statement, TERM 206 may be a list; in that case, DEFINE invokes CONVERT 809 to convert the list to a LISP form and then recursively invokes itself to define each of the undefined TERMs 206 in the LISP form. Next, DEFINE 607 determines whether TERM 206 is a LISP symbol; if it is not, DEFINE 607 simply returns TERM 206 unchanged. If it is, DEFINE 607 determines whether TERM 206 was provided by RESTORE 633; if it was, DEFINE 607 provides TERM 206 and the copy of TDESC 705 to GETDEF 805 and returns the value returned by GETDEF 805, namely a list whose element is TERM 206. If TERM 206 was not provided by RESTORE 603, DEFINE 607 determines whether there is already a TSYM 615 for TERM 206 or if TERM 206 is a literal (i.e, there was no copy of TDESC 705). If either is the case, DEFINE returns a list whose element is TERM 206. If none of the other cases was true, GETDEF 805 is invoked by DEFINE 607 without a copy of TDESC 705.

GETDEF 805 receives an undefined term (UTERM) 803 from DEFINE 607 and may also receive a copy of TDESC 705 for the term. In the first case, GETDEF obtains DESC 205 from the user; in the second case, it simply uses TDESC 705. Next it invokes CONVERT 809 to convert it to CDESC 807, which is a LISP form. Next, UTERM 803 and CDESC 807 are provided to PROCESS-FUNCTION 811, which returns TFUNC 701 for UTERM 811. Finally, GETDEF 805 places TSYM 615 on TERMS STACK 613, and returns a list consisting of DTERM 211 corresponding to UTERM 803 to DEFINE 607. CONVERT 809 is invoked by DEFINE 607 or GETDEF 805. It receives a DESC 205 from its invoker and converts it to a LISP form, CDESC 807, which it returns to the invoker. PROCESS-FUNCTION 811 receives UTERM 803 and CDESC 807, passes UTERM 803 to DEFINE-FUNCTION 813, receives TFUNC 701 from DEFINE-FUNCTION 811, returns TFUNC 701 to GETDEF 805, and produces UTERML 815, which is a list of the UTERMs 803 from CDESC 807 which have not yet been defined. PROCESS-FUNCTION then invokes DEFINE 607 for each UTERM 803 on UTERML 815. DEFINE-FUNCTION 803 finally, creates and evaluates a DEFUN for TFUNC 701, thereby creating TFUNC 701, which it returns to PROCESS-FUNCTION 811, which in turn returns it to GETDEF 805.

As can be seen from the above description, recursive invocations of DEFINE 607 continue until all of the TERMs 206 required to define the TERM 206 for which DEFINE was invoked have been defined; only at that point, DEFINE 606 returns DTERM 211 corresponding to TERM 206. Since the user of Shell 201 must define all of the TERMs 206 required to define a given TERM 206 and can give TERM 206 only a single definition, DEFINE 606 guarantees that a set of definitions for a term 206 is complete and consistent.

Figure 9:
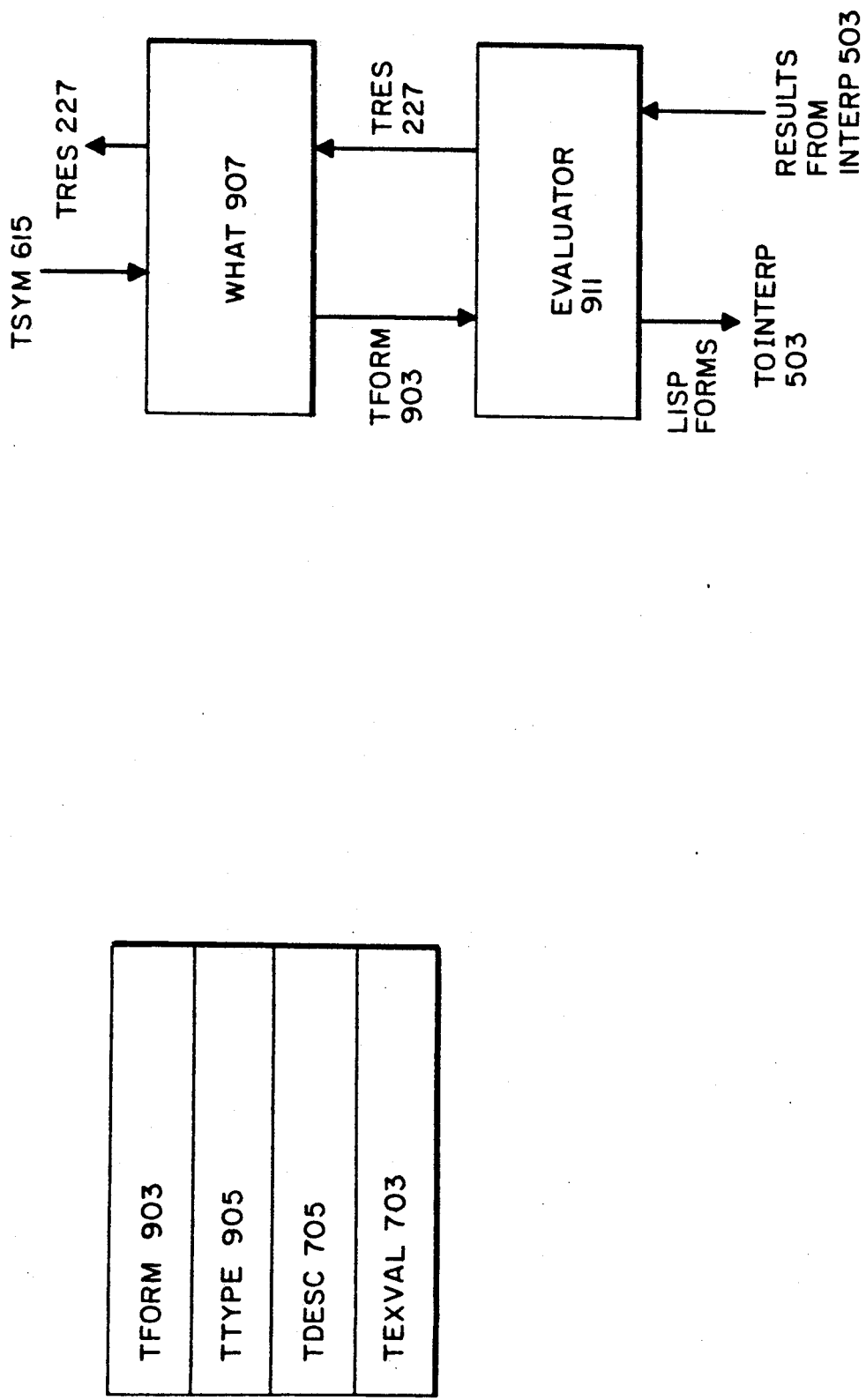
FIG. 9 is a diagram of certain improvements in the second prototype embodiment.

11. Prototype Embodiment 2: FIG. 9

Prototype embodiment 2 contains many improvements over prototype embodiment 1, including a better interface to the user and more robust recovery from user errors. Among the most important improvements included in prototype embodiment 2 are the alternate embodiments of TDEF 617 and WHAT shown in overview in FIG. 9.

TDEF 901 contains TDESC 705 and TEXVAL 703 as did TDEF 617; it does not contain TFUNC 701, and contains two new fields: TFORM 903 and TTYPE 905. The change was made to eliminate a difficulty with prototype embodiment 1: namely, that the TERM 206 to be defined might correspond to some other LISP symbol already in symbol space 505. In that case, the definition produced by DEFINE 607 for TERM 206 would supersede the previously-existing definition of the symbol. The problem is solved in prototype embodiment 2 by replacing TFUNC 701 with TFORM 903, a LISP form which is not itself executable as a function but may be executed by an EVALUATOR function 911 in TIE 219. TTYPE 905 contains information about the kind of value returned when TFORM 905 is executed by EVALUATOR 911.

The remaining portion of FIG. 9 shows the relationship between WHAT function 907 and EVALUATOR 911 in prototype embodiment 2. WHAT 907 receives the WHAT CFORM 605 from EXPERT 603 as before, but instead of simply performing a LISP eval operation on TSYM 615 provided as an argument to WHAT, it provides TFORM 903 from TDEF 901 for TSYM 615 to evaluator 911, which in turn produces LISP forms to perform the operations specified in TFORM 903 and provides them to LISP interpreter 503. LISP interpreter 503 returns the results of the evaluation of the LISP forms to evaluator 911, which then makes these results into TRES 227, which it returns to WHAT 907, which in turn returns it to the user.

12. Further Development of Definition-based Expert Systems

Further experience with and development of the definition-based expert system described in the foregoing portion of the present patent application has shown that definition-based expert systems are even more broadly applicable than previously thought. The further development has also resulted in the creation of a number of new operations which may be specified in the definition of a term and the development of new value types. The following additional material will first explain how a definition-based expert system may be employed as an application development system and how certain of the new operations greatly increase the usefulness of such a definition-based expert system and will then disclose other new operations and the new value types.

13. Application Development Systems Employing Definition-based Expert Systems Historically, applications for computers have been written in languages such as COBOL or C by computer programmers with specialized knowledge of those languages and of the computer system the application is being developed for. This fact has had a number of undesirable consequences. First, writing applications in standard computer languages is a laborious process; even a simple application may require thousands of statements. Second, the technical skills required for programming in the standard programming languages have made programmers scarce and expensive. Third, and perhaps most important, there have been communication difficulties between the programmers, who understand programming languages and computer systems, but not the task the application program is intended to perform, and the intended users of the application program, who understand the task, but know nothing of programming languages and computer systems. As a consequence, it often happens that an application program must be rewritten several times before it does what its users want it to do.

The problems described above had lead in recent years to the creation of application development systems which are task-oriented, i.e., they describe an application in terms familiar to those who work in the area the application is intended for. The advantages of such an application development system are clear: in many cases, the applications can be developed by their users and programmers are no longer required. Even where programmers are still required, the use of a task-oriented application development system reduces the probability of design errors, simplifies communication between the programmer and the users, and greatly reduces the amount of code that must be written. The definitional expert system described in the present patent application is an example of such a task-oriented application development system. While prior-art rule-based expert systems often required specialized knowledge engineers and computer programs, the definition-based expert system of the present patent application can be developed by anyone who can express a body of knowledge as a hierarchy of definitions. For example, as shown in the patent application, a lawyer who understands the legal definition of fraud can develop a definitional expert system which permits a lay person to interactively determine whether a fraud has occurred. Similarly, a banker who understands how his bank determines whether to grant a loan to an applicant can develop a definitional expert system to interactively determine whether a loan should be granted.

The usefulness of the definitional expert system as a task-oriented application development system has been greatly increased by certain new operators in definitions which cause the computer system to perform operations in addition to obtaining values when the term to which the definition belongs is evaluated. With the addition of these new operators, the definitional expert system has become a general application development system for developing highly-interactive applications. An example of such an application is one which might be termed an "automatic realtor". The application interactively prompts the user to provide information concerning the user's space requirements, architectural preferences, and financial circumstances and then shows the user images of houses which are presently on the market and meet the user's requirements.

14. The "Side Effect" Operators

As explained in the foregoing patent application, when term inference engine (TIE) 219 (FIG. 2 responds to a WHAT inference engine command 217 to produce an expert response regarding a particular defined term (DTERM) 211, it produces the expert response by evaluating defined term 211's definition (DEF) 213. If that definition involves other defined terms 211, the definitions 213 for those terms are evaluated until every defined term 211 in the hierarchy of definitions for the particular defined term 211 has been evaluated. As may be seen from the above, every DEF 213 must return a value when the definition is evaluated. However, the evaluation of a definition may do more than produce a value. For example, the ASK operator as disclosed in the foregoing patent application has the form:

ASK NUMBER "prompt string"

When a term 211 whose definition 213 includes this operator is evaluated, the prompt specified by "prompt string" is output to the display and the user's response to the prompt is returned as the value of the operator. In this case, evaluating the term 211 not only resulted in the return of the value specified by the user's response, but also resulted in the performance of display-related operations including the output of the prompt to the display and receiving the input value. These other operations are termed generally "side effects" because they are side effects of the evaluation of definition 213.

In the course of the further development of the definition-based expert system, it has turned out to be useful to include operators whose primary purpose is the side effects they produce. In a presently-preferred embodiment, each of these operators gives the term it is used to define the Boolean value TRUE when the operation succeeds and otherwise indicates an error. Moreover, information required for the operation may itself be specified by means of a term 211. The operators in a presently-preferred embodiment include the following:

COPY copies one file specified in the operator to another file specified therein.

DELETE deletes a file specified in the operator.

DISPLAY displays information on the display. The source of the information may be a text string defined in the operator, a text file, or an image.

PRINT prints a text expression specified in the operator to a file specified in the operator.

RENAME renames a file specified in the operator. A detailed discussion of the DISPLAY operator will serve to exemplify the principles involved in the above operators.

15. Detailed Discussion of the DISPLAY Operator

In the following, a discussion of the syntax and function of the DISPLAY operator will be followed by a discussion of the implementation of the operator. The syntax of the DISPLAY operator will be shown using the following conventions:
1. Upper-case names indicate terms 211 or expressions. An expression may be anything which has a value, including a term 211.
2. Square brackets indicate optional items.

In a presently-preferred embodiment, there are two classes of the DISPLAY operator. Evaluation of a term 211 defined with class of the operators results in the display of text; the other results in the display of an image. Beginning with the first class, there are two operators: DISPLAY and DISPLAY FILE. With the DISPLAY operator, the displayed text is internal to the definition-based expert system; with the DISPLAY FILE operator, the text is contained in a MSDOS file.

The syntax of the DISPLAY operator is as follows:

display TEXT-EXPRESSION
[TEXT-EXPRESSION . . .]

DISPLAY thus specifies a list of one or more text expressions to be displayed. The text expression may be any construct in the definion-based expert system which yields a text string as a value. The expression may thus be a constant, a term 211 which evaluates to a text string, or a combination of constants, terms 211, and operators which yield text string results. Of course, as in other definitions, if a term 211 in the DISPLAY operator has not yet been defined, definition processor 207 will request a definition for the term. For example, a term 211 SAY_HI defined with the following display operator:

display "Hi"

would, when evaluated, cause "Hi" to appear on the display.

With DISPLAY FILE, the text is contained in an MSDOS file external to the definition-based expert system. The syntax of DISPLAY FILE is display file TEXT-EXPRESSION For this operator, the value of TEXT-EXPRESSION must be the name of a MSDOS text file. Evaluation of the term 211 defined with this operator causes the contents of the file identified by TEXT-EXPRESSION to appear on the display.

The first of the two display operators for images is DISPLAY PICTURE, which displays an image which is stored in a MSDOS file in one of a number of standard image formats. The syntax is as follows:

display picture TEXT-EXPRESSION [SIZE]

The value of TEXT-EXPRESSION must be the name of an MSDOS file containing the image. SIZE may have one of four values which determine the initial size of the image: tiny, small, normal, and large. When the term 211 defined with the operator is evaluated, the image in the file appears on the display.

The second display operator for images displays an image which is provided by a Wang Laboratories, Inc. image management system called PC-WIIS. PC-WIIS is implemented in personal computers of the IBM PC type which are running the MSDOS WINDOWS display management system. The operator has the syntax:

display "*WIIS*" TEXT-EXPRESSION

In this case, the value of TEXT-EXPRESSION must be the pathname of a PC-WIIS image file. When the term 211 defined with this operator is evaluated, PC-WIIS displays the image in the file on the display.

The side effect operators, like the operators previously discussed in the application, are implemented by means of LISP functions which are stored in LISP environment 501 (FIG. 5) and executed by LISP interpreter 603. LISP environment 501 includes built-in LISP functions which open MSDOS files, close them, read them, delete them, and indicate whether a given MSDOS file exists. These functions are used to implement the LISP functions for the DELETE, RENAME, DISPLAY, and DISPLAY FILE operators. The other functions are implemented by means of a built-in LISP sys:dos function which specifies a program to be executed by MSDOS and parameters for the program. When the LISP interpreter executes the sys:dos function, the result is a software interrupt to MSDOS, which interrupts execution of the LISP interpreter and executes the program specified in the sys:dos function. At the end of execution of the program specified in the sys:dos function, execution of the LISP interpreter resumes.

The DISPLAY operators for images may serve as examples of the use of sys:dos. In the case of DISPLAY PICTURE, the program executed by means of sys:dos determines the format of the image to be displayed and then displays the image; after the display execution of the LISP interpreter resumes. In the case of the version of DISPLAY used to display PC-WIIS images, the operator presupposes that the user first executes the MSDOS WINDOWS display management program, then executes PC-WIIS from MSDOS WINDOWS as required to initialize the PC-WIIS image system, and thereupon executes the definition-based expert system of the present invention out of MSDOS WINDOWS. Under these circumstances, the LISP sys:dos function results in the execution of the program specified in the sys:dos function results in the execution of the program specified in the the program specified in the sys:dos function simply calls a PC-WIIS routine which opens the image file specified in the function, calls another PC-WIIS routine which displays the image in the on the display, and then responds to a keystroke input by the user by calling a third PC-WIIS routine which closes the image file and then returning. Upon return, the LISP interpreter again resumes. In the automatic realtor application discussed above, the images of the houses are managed by PC-WIIS, and the DISPLAY "*WIIS*" operator causes the display of the images.

16. The CALL Operator

The CALL operator specifies a non-LISP function which is invoked when the term 211 defined with the operator is evaluated. The value returned by the function becomes the value of the term. As is apparent from the foregoing, the non-LISP function may either be invoked primarily for the value it returns or for the side effects which are produced by its execution. The operator has the following syntax:

---
call TEXT-EXPRESSION [, using SPEC-LIST] [, returning NUMBER SPEC]

---

When evaluated, TEXT-EXPRESSION must yield the name of the non-LISP function being invoked. The function may be any function which follows the interface standards of the C programming language. SPEC-LIST is a list of expressions specifying the values of the actual arguments for the non-LISP function being invoked. In a preferred embodiment, the expressions must have scalar or string values. When the non-LISP function is a mathematical function, the type of the value it returns may be specified using NUMBER-SPEC. The choices are double, float, int, long, unsigned int, and unsigned long. The default is int.

In a preferred embodiment, the call operator is implemented using an external program interface which permits the LISP interpreter to make calls to non-LISP programs when no operating system intervention is required for the call. The external program interface includes an EPI.EXE file which includes executable code for all of the functions specified in call operators and executable code which sets up and performs the calls. New functions are added to the EPI.EXE file simply by using a linker to link their executable code into EPI.EXE. Setting up and performing a call in a preferred embodiment is complicated by the fact that the LISP interpreter runs in protected mode in extended memory, while the executable code in EPI.EXE execute in real mode in base memory. Consequently, when a term 211 defined with the call operator is evaluated, the processor must switch from protected to real mode and the code in EPI.EXE which calls the function specified in the call operator must copy the values of the actual arguments from extended memory to base memory, performing any necessary type conversions as it does so. On return, the reverse happens: the code in EPI.EXE must copy the values of the actual arguments and the returned value from base memory to extended memory, performing any type conversions as it does so, and on return from EPI.EXE, the processor must switch from real mode to protected mode.

17. Table Terms and Values

The definition-based expert system as described in the parent of the present application permitted terms 211 having Boolean, arithmetic, and character-string values and defined operations involving those value types. The improved definition-based expert system described herein further permits definition of terms 211 as tables and fields in tables and operations on table values. A table is arranged in rows and columns. Each column is specified by a term 211, and the values contained in one of the colmns serve as a key by means of which a given row may be selected. For example, a term 211 called CLIENTS might have columns specified by the terms 211 NAME, ADDRESS, nd TELEPHONE and a row for each client. The row for a single client might look like this:

| NAME | ADDRESS | PHONE |
|---|---|---|
| Smith, John | 303 W. First St., New York, NY. | 301-666-5555 |

If NAME served as the key, the row could be specified by means of "Smith, John".

In the improved definition-based expert, a term may represent one of two kinds of tables. The first kind is a base table. Base tables actually contain data values. The data values may be specified in definition 213 of the base table, may be obtained from the user by means of the ASK operator, or may be obtained from an external file. The second kind is a query table. A query table is a table which is produced by a query operation from a base table or another query table. For instance, a table NEW_YORK_CLIENTS might be defined from CLIENTS by running a query operation which extracted all rows from CLIENTS in which ADDRESS specified New York, N.Y.

Table operators may used with either kind of table. The operators include the following:

- Look-up operators for obtaining the value of a field specified by a term 211 from a row;
- aggregate operators for obtaining values derived from all of the fields in a table specified by a given term 211;
- quantifying operators for obtaining Boolean values derived from all of the fields in a table specified by a given term 211.

The following will first deal with the definition of base tables, then with the definition of query tables, and finally with the table operators.

18. Defining Base Tables

In a preferred embodiment, the syntax used to define a term 211 as having a base table as its value may define a base table which employs a numeric key field or one which employs a character-string key field:

---
table with number key NUMBER-TERM
table with text key TEXT-TERM

---

In the case of the base table with the numeric key field, NUMBER-TERM is the term 211 which identifies the column of the table whose numeric values will be used as keys; in the case of the base table with the text key field, TEXT-TERM is the term 211 which identifies the column of the table whose text values will be used as keys. The table operator which defines CLIENTS looks like this:

table with text key NAME

Terms 211 identifying columns in the table are defined by means of the FIELD OF operator. The syntax depends on whether the values are specified in definition 213 or are obtained externally. In the first case, the syntax is:

field of TABLE TERM, values VALUE-LIST

The TABLE-TERM is a term 211 representing a table value; the values in VALUE-LIST are constants have the type required by the values contained in the column identified by the term 211 being defined. If the field being defined was specified as a key in the table definition, the number of values in the list determines the number of rows in the table. For example, in the case of CLIENTS, the field NAME might be defined like this:

field of CLIENTS, values "Smith, Adam" "Smith, John" "Smith, David"

defines a CLIENTS table with three rows.

The syntax for specifying that the values for a column of a table are to be obtained externally is the following:

field of TABLE-TERM, ask [QUOTED-TEXT [, for every TABLE-OR-QUERY-EXPRESSION]]]

TABLE TERM is again the term 211 for the base table in which the term 211 being defined specifies a column. "ask" indicates that the values for the specified column are to be obtained interactively from a user at a terminal. QUOTED-TEXT specifies a prompt string to be output when the user is asked. If nothing further is specified the definition-based expert system will output any prompt and the value of the key field for the row and wait for user input. For example, ADDRESS might be defined like this:

field of CLIENTS, ask "What is the address of"

For each row in CLIENTS, the expert system will output the prompt followed by the value of NAME for that row and wait for the user to provide the address. As will be explained in more detail below, The inputs may be restricted to rows meeting specific criteria by means of the optional "for every TABLE-OR-QUERY-EXPRESSION". For example, ADDRESS in CLIENTS might be defined as follows:

field of CLIENTS, ask "Please input the address of", for every CLIENTS where NAME is "Smith, John"

This will cause the user to be asked only for John Smith's address, and that address will be written to the ADDRESS field of the row containing "Smith, John" as its NAME value. As may be seen from the foregoing, a given table may have columns filled using ASK and others filled using VALUES. If ASK is used to fill fields specified as a key in the table definition, the size of the table will depend on the number of fields filled.

Additionally, a term 211 may be defined as a table which is stored in a MS-DOS file. In that case, definition 213 is as follows:

dosfile table

The expert system shell of the present invention responds to such a definition with a sequence of menus which permit the developer of the application to specify which MS-DOS file contains the table's data and how the terms 211 defining columns in the table relate to fields in the MS-DOS file. Definitions for such tables do not contain ask operators or value operators.

19. Defining Query Tables

A query table is a query table which is defined by means of a query operation on a base table or another query table. The syntax of the query table definition is the following:

TABLE-OR-QUERY-TERM where BOOLEAN-EXPRESSION

The TABLE-OR-QUERY-TERM specifies the base or query table from which the rows are selected; the BOOLEAN EXPRESSION specifies the condition under which a row is to be selected. For example NON_JOHN_SMITH_TABLE could be defined as follows:

CLIENTS where NAME is not "Smith, John"

The resulting query table will have all of the rows of CLIENTS except the row where NAME has the value "Smith, John". As noted above, the "where BOOLEAN EXPRESSION" operator may also be used to control which rows are selected for interactive input to a base table using the "ask" operator.

20. Operations on Tables

Once a table has been defined as set forth above, terms 211 may be defined by specifying operations on the table. The simplest operation is selecting a field from a specified row. The operator that does this is the OF operator:

FIELD-NAME-TERM of ROW-SPECIFYING-TERM

The FIELD-NAME-TERM is the term 211 identifying a field in the row. The ROW-SPECIFYING-TERM is a term 211 whose definition specifies a single row. definition 213 may thus define a base table having only a single row or a query table having only a single row. For example, the query table JOHN_SMITH_TABLE might be defined as CLIENTS where NAME is "Smith, John"

JOHN_SMITH_TABLE thus consists of a single row, and an of operator defining a term JOHN_SMITH_ADDRESS would look like this:

ADDRESS of JOHN_SMITH_TABLE

Aggregate operators are operators which produce a result based on part or all of the data contained in a column of a table. The operators return text, arithmetic, or Boolean values. The text aggregate operator is COLLECT, which makes a text string consisting of values from a column. A new line character is appended to the end of each value in the string. The operator has the syntax:

collect FIELD-TERM-TEXT-EXPRESSION for every TABLE-OR-QUERY-EXPRESSION

FIELD-TERM-TEXT-EXPRESSION is an expression whose definition involves a term 211 which identifies a column in the table specified by TABLE-OR-QUERY-EXPRESSION. The COLLECT operator then makes a text string as specified by FIELD-TERM-NAME-EXPRESSION of the values in the field. Here and in the following, TABLE-OR-QUERY-EXPRESSION may of course include a WHERE operator as described above. For instance, a term 211 NAME_LIST might be defined like this:

collect NAME for every CLIENTS

NAME_LIST would have the character-string value

"Smith, Adam
Smith, John
Smith, David"

An important aspect of the fact that an expression involving a field name can be used in the COLLECT operator is that the value defined by the COLLECT operator may be computed from the value returned from the fields.

The arithmetic aggregate operators include operators for obtaining the average of the values in the fields, the maximum of the values in the fields, the minimum of the values in the fields, the total of the values in the fields, the number of fields, and the percent of the fields meeting a given condition. The average operator can stand as an example for average, maximum, minimum, and total. The syntax is the following:

average FIELD-TERM-NUMBER-EXPRESSION for every
TABLE-OR-QUERY-EXPRESSION

FIELD-TERM-NUMBER-EXPRESSION is an expression whose evaluation involves a term 211 specifying a number field in a base table or query table defined by TABLE-OR-QUERY-EXPRESSION. Again, the use of an expression involving the field term permits specification of computation on the result returned by the operator.

The COUNT EVERY operator simply counts the number of rows in a specified table. The syntax is as follows:

count every TABLE-OR-QUERY-EXPRESSION

For example, a term 211 NUMBER_OF_CLIENTS could be defined as follows:

count every CLIENTS

With the table CLIENTS of the present example, NUMBER_OF_CLIENTS would have the value 3.

The PERCENT WHERE operator determines what percentage of the values of a specified field in a table fulfill a specified condition. The operator has the syntax percent TABLE-OR-QUERY-TERM where
FIELD-TERM-BOOLEAN-EXPRESSION TABLE-OR-QUERY-TERM specifies the base table or query table upon which the operation is being performed, and FIELD-TERM-BOOLEAN-EXPRESSION is a Boolean expression involving a term 211 specifying one of the fields in the specified table. For instance, a PERCENT_JOHN_SMITH term 211 might be defined as follows:

percent CLIENTS where NAME is "Smith, John"

PERCENT_JOHN_SMITH would have the value "33" because "Smith, John" is one of three rows in the table.

The Boolean aggregate value operators are FOR EVERY, which determines whether a Boolean expression involving a term 211 which is a field name is true for every row of the table, and FOR SOME, which determines whether such a Boolean expression is true for any row of the table. The syntax of FOR SOME is exemplary for both:

for some TABLE-OR-QUERY-EXPRESSION,
FIELD-TERM-BOOLEAN-EXPRESSION

TABLE-OR-QUERY-EXPRESSION specifies the base table or query table upon which the operation is being performed and the FIELD-TERM-BOOLEAN-EXPRESSION is a Boolean expression involving a term 211 specifying a field in the table. An example would be a definition for a term IS_JOHN_SMITH_THERE?, which would look like this:

for some CLIENTS, NAME is "Smith, John"

As may be seen from the foregoing table values and table terms 211 represent a major enhancement of the rule-based expert system. Terms 211 may now represent ordered collections of data and fields within the collections, and operators on tables permit the definition of query tables and operations which for both types of tables permit retrieval of individual field values and computation of results depending on the values in an entire column.

21. "Don't Know" Values

A problem of the definition-based expert system as originally implemented was that it could not adequately handle user responses which indicated that the user did not know the answer to a question addressed him by the expert system. This problem has been overcome by permitting designers of the definition-based expert systems of the present invention to add a "don't know" value to each of the classes of scalar values used in the definition-based expert system and add the notion of "don't know dependency" for scalar values and table values which are not themselves "don't know" values but are dependent on "don't know" values. Where "don't know" values are specified, users of the system may provide "don t know" as a possible input to the system. Provision of the value in a preferred embodiment is by means of a function key or by means of selection from a drop-down menu.

For example if "don't know" values are specified and the field PHONE of CLIENTS is defined as follows:

field of CLIENTS, ask "What is the telephone
number of"

the user can specify "Don't know". If the user so specifies, the value of PHONE for that field is "Don't know". Assuming that "Don't know" was the answer for the row for which NAME has the value "Smith, John", a term 211 JOHN_SMITH_PHONE defined with PHONE of JOHN_SMITH_TABLE would specify PHONE for that row and would have the value "Don't know". Further, the value of a term 211 PHONE_LIST defined for the field PHONE with the COLLECT operator would be "don't know dependent" because at least one of the values in the column defined by PHONE is a "don't know" value. Assuming that only John Smith's phone was not known, the PHONE_LIST definition collect PHONE for every CLIENTS would yield a value like:

```
"555-1111
 666-2222"
```

Moreover, the definition-based expert system will associate a "don't know" dependency indication with the value, i.e., an indication that a "Don't know" value was involved in its computation. In this case, the indication specifies two things: the location in the value which would have been occupied by the "don't know" value and that one of the three fields in the column has a "don't know" value.

Evaluation of a term 211 defined with almost any operator available in the definition-based expert system may involve evaluation of another term 211 which has a "don't know" value. In a preferred embodiment, the general rules for the determination of the value of a term 211 where a "don't know" value is involved are the following:

1. If the value of the result is independent of the "don't know" value, the result is returned without any indication of don't know dependencies.
2. If the value of the result is dependent from the "don't know" value and no value can be determined without the "don't know" value, the returned result is "don't know" with an indication of "don't know" dependencies.
3. If the value of the result is dependent from the "don't know" value but some value can be determined without the "don't know" value, the returned result is the value so determined with an indication of "don't know" dependencies Such a result is termed an estimate.

An example for the first two rules is given by the behavior of the MULTIPLY operator indicated by "*" when one of its operands has a value of "don't know.". If the other operand has the value 0, the operator returns 0, since that result is independent of the value of the other operand. Otherwise, the MULTIPLY operator returns "don't know". An example for the third rule is the COLLECT operator. As shown by the example, if a field of the collected column has the value "don't know", COLLECT ignores that field when it makes the result string.

The indication of "don't know" dependencies which is returned along with "don't know" or an estimate includes the term 211 from the hierarchy of definitions for the term 211 being evaluated whose value is directly dependent on "don't know" and when the value is an estimate, estimate information which indicates the extent to which the estimate is affected by "don't know" values. The content of the estimate information depends on the operator which produced the estimate. Generally speaking, when the estimate is a string value, the estimate information includes the index of the position in the string which the first component having a "don't know" value would have occupied. When the estimate is produced by an operator such as AVERAGE which examines the contents of all of the fields of a column, the estimate information includes the total number of fields of the column and the number of fields with "don't know" values. An operator such as COLLECT, which both produces a string and examines the contents of all of the fields of a column, has estimate information including both the position of the first "don't know" value in the result string and the total number of fields and the number of fields with "don't know" values.

In a preferred embodiment, there are two special Boolean operators which permit detection of "don't know" values and estimates. The first detects "don't know" values and has the syntax:

TEXT-NUMBER-BOOLEAN-EXPRESSION=-
don't know

The operator returns the value TRUE if the expression has the value "don't know" and otherwise returns false. An example of its use would be in a definition of DONT_KNOW_ABOUT_JOHN_SMITH_PHONE which looked like this:

JOHN_SMITH_PHONE=don't know

Since the value of JOHN_SMITH_PHONE is the value of the PHONE field for John Smith's row of CLIENTS, DONT_KNOW_ABOUT_JOHN_SMITH_PHONE has the value TRUE. The second detects estimates and has the syntax:

TEXT-NUMBER-BOOLEAN-EXPRESSION=-
don't know estimate

The operator returns the value TRUE if the expression is an estimate and otherwise returns FALSE. An example of its use would be a definition of PHONE_LIST_INCOMPLETE which looked like this:

PHONE_LIST=don't know estimate.

Here, PHONE_LIST is an estimate, so PHONE_LIST_INCOMPLETE will have the value TRUE.

22. Implementation of Don't Know Values

As previously pointed out, operators are implemented in a preferred embodiment by means of LISP functions. In the preferred embodiment, the functions for the operators return lists. The implementation of "don't know" values in a preferred embodiment takes advantage of this feature and of a built-in LISP special symbol, NIL. The value of NIL in LISP is the empty list and, in contexts requiring Boolean values, the value FALSE. NIL is used in the preferred embodiment to represent "don't know". To distinguish NIL from Boolean values, the present embodiment has defined yes-no operations. These operations work like Boolean operations, except that the LISP Boolean primitive symbol T has been replaced by the symbol YES and the Boolean primitive symbol NIL has been replaced by the symbol NO.

In the preferred embodiment, the list returned by a function always has as its first element the value required by the term 211 defined by means of the function. If there are "don't know" dependencies, the first element will itself be a list. The first element of that list will be the returned value, i.e., either NIL representing "don't know" or an estimate. The next element is the don't know dependency indication. If the returned value is NIL, the dependency indication is a list of the terms 211 whose "don't know" values made return of the "don't know" value necessary. If the returned value is an estimate, the dependency indication is a list in which each element is a list consisting of a term whose "don't know" values made the estimate necessary and the estimate information. For example, the required value returned by PHONE_LIST would be a list of the following form:

```
("555-1111
666-2222" 9 (PHONE 1 3))
```

The text string is of course the string made by the COLLECT function; the value 9 is the index (counting the new line character) of the position of the first "don't know" value in the text string; PHONE is the field name for the column which COLLECT read to obtain the string; 1 3, finally, indicate that there was 1 "don't know" value out of three total fields.

The advantages of a definition-based expert system with "don't know" values which have the properties just described are clear. Beyond making it possible for a user to indicate that he doesn't know, the definition-based expert system can determine whether the "don't know" makes a difference and if it does, whether an estimate is possible. Moreover, the "don't know" dependency information makes it possible for the definition-based expert system to determine which terms 211 are the sources of the dependency and in the case of the estimate, to determine to what extent the "don't know" values may affect the value for which the estimate has been made.

23. A Document Generation System Employing the Definition based Expert System The definition-based expert system disclosed in sections 1-22 above becomes a document generation system with the addition of a single new operator. The operator is called the wp text operator. The following disclosure will first describe the wp text operator, then discuss an example document template, thereupon provide an overview of the implementation of the wp text operator in a preferred embodiment, and finally present details of the preferred embodiment.

24. The WP TEXT Operator

The wp text operator is used to define terms 211 of the text type as portions of a template document written using the WP+ editor produced by Wang Laboratories, Inc. The WP+ editor is disclosed in detail in U.S. Pat. No. 4,633,430, James Lee Cooper, *Control Structure for a Document Processing System*, issued 12/30/86, which is hereby incorporated by reference into the present disclosure. The wp text operator has the syntax:

wp text [if YES-NO-EXPRESSION]

When the definition-based expert system evaluates term 211 defined by the operator, the term 211's value is the portion of the template document specified by the term's definition. When the definition-based expert system is being used as a document generation system, the value of term 211 defined by the wp text operator is output to the output document being produced by the document generation system. When the optional if YES-NO-EXPRESSION is present, the term 211 defined by the wp text operator is evaluated only if the YES-NO-EXPRESSION evaluates to YES; if it evaluates to NO, the term 211 is not evaluated; if the YES-NO-EXPRESSION evaluates to a "don't know" value as described in section 21 above, the term 211 evaluates to the string "don't know".

For example, a document generation system which generates wills defines a term 211 DIST-LIFE-INSURANCE ON CHILD which evaluates to the clause from the template document for distribution of life insurance to a child as follows:

wp text if TRANSFER-INS-ON-CHILD

TRANSFER-INS-ON-CHILD is a yes-no term 211 which is defined as the user's response to the question, "Does the client wish to transfer interest in life insurance on any children to children and descendents?". When a will is generated using the will generation system, the person for whom the will is being generated answers the question. If the answer is yes, the template portion identified by DIST-LIFE-INSURANCE-ON-CHILD is included in the will; if the answer is no, it is not; if the answer is "don't know", the term 211's value is that string.

As may be seen from the foregoing, a document may be defined by simply concatenating string terms defined with the wp text operator. For instance, the will generation system includes the text term GENERATE WILL, which is defined as follows:

```
WILL-TITLE;
REVOKE-PRIOR-WILL;
DISTRIBUTION;
UNDER-AGE-PROVISION;
PAYMENT-OF-DEBT;
CUSTODY-OF-MINORS;
MISC-PROVISIONS;
EXECUTORS
```

The ";" is a concatenation operator, and each of the terms 211 being concatenated is either itself a wp text term or a concatenation of wp text terms. Thus, when GENERATE WILL is evaluated, its value is a concatenation of the template portions defined for the wp text terms. In document generation, that value is produced in a WP+ document. In a preferred embodiment, producing the value in a WP+ document involves two steps: in a first step, a value is produced which includes a list of the WP text terms in the order in which the template portions they represent are to appear in the output document; in a second step, the template portions on the list are copied from the template document to the output document in the order in which they appear on the list.

In a preferred embodiment, there are two methods of defining terms 211 with the wp text operator. In the first method, when a user of expert system shell 201 defines a term 211 using the wp text operator, a component of expert system shell 201 automatically run the WP+ editor produced by Wang Laboratories, Inc. The user of shell 201 then uses the WP+ editor to add the text represented by the term 211 to the template document. In the second method, the user of shell 201 uses WP+ independently of shell 201 to compose the template document. The names of the wp text terms 211 are included in the template document. When this approach is used, the user provides the template document name to shell 201, which then reads the document and asks the user whether he wishes to add the wp text terms 211 defined in the template document to the knowledge base. If the user wishes to add a term, shell 201 makes a definition for the term.

As will be described in more detail below, the text may include other terms 211. These terms 211 are called merge terms. When definition processor 207 adds the new wp text term 211 representing the text to term store 215, definition processor 207 checks the merge terms in the text to determine whether they have definitions in TS 215; if they do not, the user of shell 201 is prompted to provide a definition as described at section 5 above. When a wp text term 211 is evaluated by inference engine 219, each merge term in the portion of the template which defines the wp text term is evaluated; when the portion of the template 1001 represented by w text term 211 is output to the output document, each merge term in the template portion is replaced by the merge term's value. If the merge term's value is "don't know", a string of that value replaces the merge term. In a preferred embodiment, a merge term may be another term 211 defined with the wp text type.

25. The Template Document: FIG. 10

FIG. 10 shows an example of a template document 1001 used in a preferred embodiment to define wp text terms. In a preferred embodiment, template document 1001 is written using the WP+ editor. In the figure, the portion of template document 1001 which defines a wp text term appears as a fragment 1002. Each fragment 1002 begins with fragment term 1003, which is identical with the wp text term 211 defined by the fragment and ends with a colon (:). The fragment term 1003 and the colon 1009 are identified by a fragment term attribute which the WP+ editor assigns to the text string representing fragment term 1003 and to colon 1009 In FIG. 10, text with the fragment term attribute is represented by text in upright bold face type.

The text between fragment term 1003 and the colon is fragment text 1005. As previously indicated, fragment text 1005 may include merge terms, shown in FIG. 10 with the reference number 1007. A merge term 1007 is identified in fragment text 1005 by a merge term attribute which the WP+ editor assigns to the text string representing merge term 1007. In FIG. 10, text with the merge term attribute is represented by underlined italic bold face text. The merge term Client may serve as an example of merge terms 1007 generally. Client is a text term which is defined as a field of a table term which contains the name of the client. When a will is produced, Client is replaced by the name from the table term. In a preferred embodiment, when the first letter of a merge term 1007 other than a wp text merge term 1007 is capitalized, the first letter of the value which replaces the merge term is also capitalized. In a preferred embodiment, the editor also responds to the fragment term attribute and the merge term attribute by altering the manner in which text strings having those attributes are displayed or printed. Consequently, a user of the document generation system can determine from a display or printed output of template document 1001 which text string is the fragment term 1003 being defined by the fragment and which included text strings are merge terms 1007. Template document 1001 may additionally include comments, i.e., text which is included in template document 1001 but is not part of any fragment 1002. In a preferred embodiment, text which belongs to a comment is indicated by a comment attribute. Again, the comment attribute alters the manner in which text strings having the attribute are displayed or printed.

Figure 11:
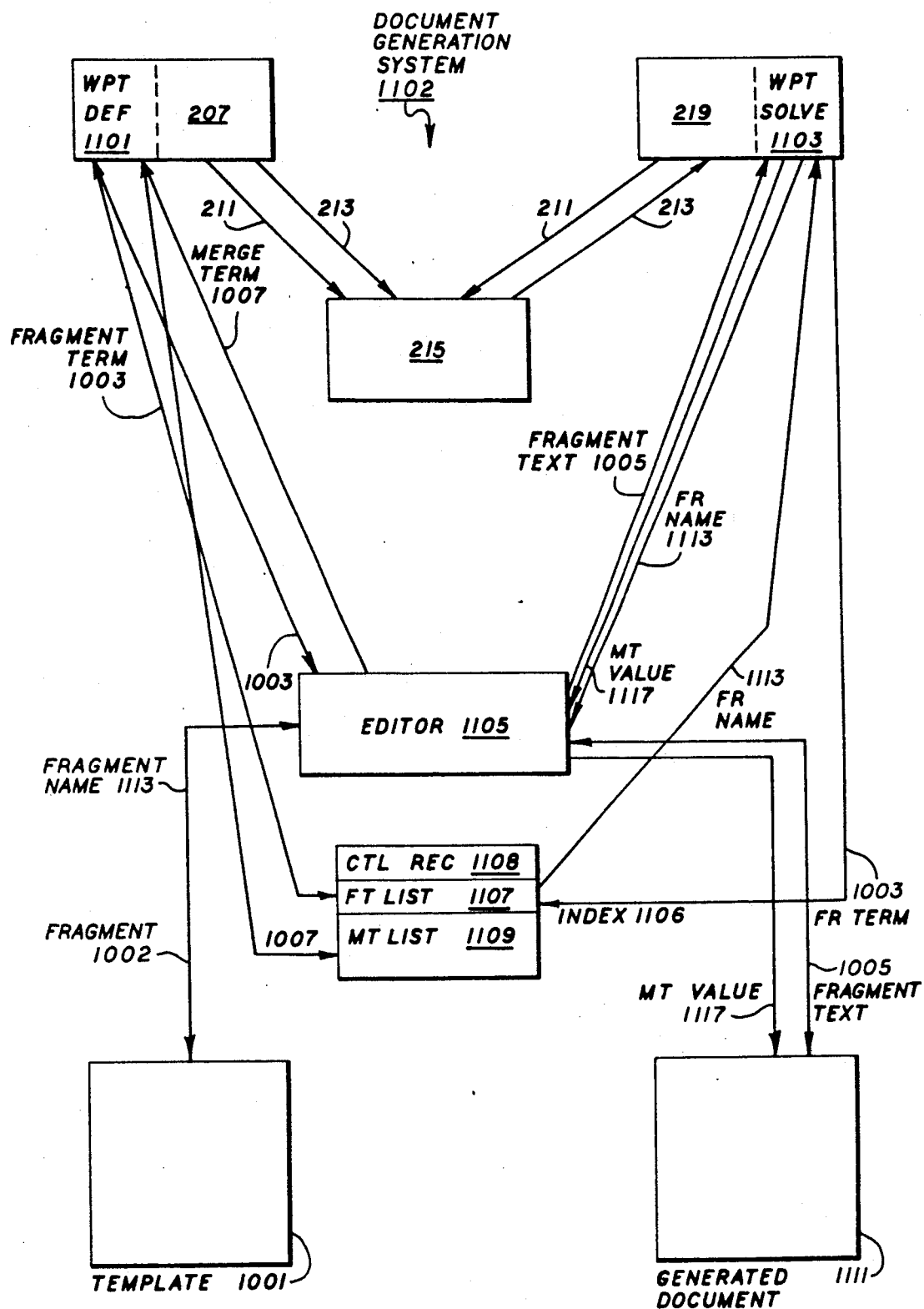
FIG. 11 is a conceptual block diagram of the document generation apparatus.

26. Overview of Implementation of the wp text Operator in a Preferred Environment: FIG. 11

FIG. 11 is a block diagram of the implementation of a document generation system 1102 based on the use of the WP text operator in the definition-based expert system shown in FIG. 2. FIG. 11 shows definition processor 207, term inference engine 219, and term store 215 from that figure and the additional components required for the WP text operator. Portions of FIG. 2 which do not appear in FIG. 11 are understood to be the same as in FIG. 2. As in FIG. 2, arrows show the flow of data between the components. The additional components are WP text operator defining component 1101 of definition processor 207, WP text solving component 1103 of term inference engine 219, editor 1105, index 1106, template document 1001, and generated document 1111. In a preferred embodiment, components 1101 and 1103 are LISP functions executed by LISP environment 561.

Editor 1105 is a version of the WP+ editor which has been adapted to operate on a microprocessor running the MS-DOS (TM) operating system produced by Microsoft, Inc. LISP interpreter 501 employs the sys:dos function to invoke editor 1105, as described at the end of section 16 above. Other editors may be employed in the same manner as the WP+ editor. Editor 1105 is understood to provide not only interactive editing, but also an application interface which permits other application programs to use the editor to perform editing operations on documents.

Template document 1001 is a document which has the template text from which documents will be generated by the document generation system. In a preferred embodiment, the WP+ editor locates fragments 1002 in template 1001 by means of named marks, i.e., names associated with locations in template 1001. Generated document 1111 is a document generated by the definition-based expert system from the values of the fragment terms 1003 and any merge terms contained in fragment text 1005 for the fragment terms 1003. Index 1106 is used for quick location of fragment terms 1003 and merge terms 1007 from template 1001. It contains a control record including the name of template document 1001 and the time and date at which template document 1001 was last altered by the definition-based expert system (CTL REC 1108 and two lists: FT List 1107, which is a list of fragment terms 1003 and the named marks by means of which the fragments can be located in template 1001, and MT list 1109, which is a list of the merge terms 1007 contained in fragment text 1005 of each fragment 1002. In a preferred embodiment, both lists are implemented by means of b-trees. Other implementations permitting quick search are of course possible.

The foregoing new components are employed both in the definition of fragment terms 1003 and in the generation of documents using the fragment terms. The following discussion begins with the definition of fragment terms 1003 and continues with the generation of documents.

27. Definition of Fragment Terms 1003

When definon based expert system shell 201 is performing a DEFINE operation involving a fragment term 1003, the DEFINE function, described in Section 7 above, invokes WPT DEF 1101 and provides it with fragment term 1003. WPT DEF 1101 first asks the person making the definition whether fragment term 1003 is to be included in an existing template 1001 or a new template 1001. If the user indicates a new template 1001, WPT DEF 1101 asks for the name of the new template 1001 and WPT DEF 1101 uses sys:dos to invoke editor 1105 to create the document. If the user indicates that he wishes to link to an existing template 1001, WPT DEF 1101 asks for the name of that template.

Once WPT DEF 1101 has the name of template 1001, it determines whether there is an index 1106 for template 1001. If there is not, WPT DEF 1101 creates index 1106 for the new template and places the name of the document in CTL REC 1108. The user next indicates whether he wishes to edit the template. If he does, WPT DEF 1101, creates a temporary document using editor 1105. WPT DEF 1101 then provides access to editor 1105 to the person creating the definition. That person uses editor 1105 to write fragment text 1005 represented by fragment term 1003 in the temporary document. In so doing, he gives any merge terms 1007 in fragment text the merge term attribute. When he is done, he leaves editor 1105 and WPT DEF 1101 resumes execution.

Next, WPT DEF 1101 makes an entry in FT List 1107 for fragment term 1003. The entry relates fragment term 1003 to a named mark by means of which editor 1105 can locate the fragment in template 1101. WPT DEF 1107 makes the named mark, termed henceforth a fragment name 1113, from fragment term 1003. Fragment term 1003 may be of any practical length (the limit is 30 characters in a preferred embodiment), but WP+ permits a maximum length of 10 characters for a named mark. WPT DEF 1101 begins by simply truncating fragment term 1003 if necessary to obtain the fragment name; it then searches FT list 1107 to determine whether an identical fragment name already exists; if one does, WPT DEF 1101 makes the new fragment name unique. In a preferred embodiment, WPT DEF 1101 does this by working through a collating sequence of characters beginning with the last character in the fragment name. Until a unique fragment name is obtained, WPT DEF 101 replaces the last character in the fragment name with the next character in the collating sequence and then checks to determine whether the fragment name is unique. If no unique name is found using that collating sequence, the sequence is worked through again beginning with the second-to-last character in the name, and so forth. Once a unique fragment name is obtained, WPT DEF 1101 invokes editor 1105 to add fragment term 1003 to the end of template 1001 and to give fragment term 1003 the fragment term attribute, then uses editor 1105 to create a named mark using fragment name 1113 in template 1001. The named mark indicates the location of the last character in fragment term 1003. The next step is to use editor 1105 to copy the fragment from the temporary document to template 1001. After this is done, the temporary document is deleted. The last step is to use editor 1105 to append colon 1009 to the fragment and to give colon 1009 the fragment term attribute.

When all of this is done, WPT DEF 1101 uses editor 1105 to search for merge terms 1007 in fragment 1002 by searching for text having the merge term attribute. Each time editor 1105 finds a merge term and returns it to WPT DEF 1101, WPT DEF 1101 adds it to the list of merge terms 1007 for the fragment 1002 in MT List 1109. When all of the merge terms for fragment 1002 are on MT list 1109, definition processor 207 takes each merge term 1007 for the fragment and determines whether the merge term 1007 has a definition in term store 215. If it does not, definition processor 207 requests the user to define the merge term 1007 as described in Section 5 above. When WPT DEF 1101 returns to the DEFINE function, the DEFINE function creates a TERM 211 and DEF 213 for fragment term 1003 in Term Store 213 as described in Section 7 above. In a preferred embodiment, DEF 213 includes the LISP symbol representing WPT Run 1103. Each fragment term 1003 is defined as indicated above; as the user leaves shell 201, shell 201 indicates the time and the date in CTL REC 1108.

As previously explained, definition-based expert system shell also includes a REDEFINE operation for redefining previously-defined terms 211. When the term 211 being redefined is a fragment term 1003, REDEFINE 101 invokes WPT DEF 1101, providing WPT DEF 1101 with the fragment term 1003 to be redefined. In this case, WPT DEF 1101 employs editor 1105 to create a temporary document, then uses fragment term 1003 and FT List 1107 to obtain fragment name 1113 corresponding to fragment term 1003, provides fragment name 1113 to editor 1105 to locate the fragment 1002 identified by fragment term 1003 in template 1001, and thereupon employs editor 1105 to copy the text following the end of fragment term 1003 to the temporary document. Copying continues until WPT DEF 1101 encounters colon 1009, which it recognizes from the fragment term attribute. The person redefining the term then uses editor 1105 to edit the text in the temporary document as described above. When the user is finished, WPT DEF 1101 proceeds as described above, except that it deletes old fragment text 1001 and replaces it with the new fragment text 1002 from the temporary document.

As indicated above, a template document 1001 may be edited using editor 1105 independently of definition-based expert system shell 201. In that situation, the person editing template document 1001 indicates a fragment term 1003 by using the WP+ editor to assign the fragment term attribute to the text string which is the fragment term 1003 and indicates a merge term 1007 by using the WP+ editor to assign the merge term attribute to the text string which is the merge term 1005, and indicates the end of the fragment by using the WP+ editor to place colon 1009 at that point and assign colon 1009 the fragment term attribute. Editor 1105 automatically includes the time and date of editing of template document 1001 in the information which it maintains concerning the document.

To include the new fragment terms 1003 in term store 215, the user of expert system shell links expert system shell 201 to the template document 1001 as indicated above. If the template document 1001 is new, or if the time and date of editing are later than those indicated for the template document in CTL REC 1108, WPT DEF 1101 verifies template document 1001. It begins verification by deleting index 1106 and making a new index 1106 for template 1101. WPT DEF 1101 then determines for each fragment term 1003 whether the fragment term 1003 is already defined in term store 215, makes a list of the undefined fragment terms 1003, and asks the user whether he wishes to add definitions to term store 215. If he does, the definitions are added as indicated above. In the course of defining an undefined fragment term 1003, WPTDEF 1101 searches fragment text 1005 for the fragment term 1003 for merge terms 1007 and processes each merge term 1007 as described above. An advantage of permitting the user to select which undefined fragment terms 1003 he wishes to add to his term store 215 is that a template 1001 may be prepared having fragment terms 1003 for different applications and a user can select only those fragment terms 1003 from the template 1001 which he requires for his particular document generation application.

8. Generation of Document 1111

In a preferred embodiment, generation of a document 1111 is a two step process. The first step is the generation of a script which includes fragment terms 1003 for all of the fragments 1002 which will appear in the output document; the second step is the generation of the output document from the script.

In the first step, a user of definition-based expert system 202 asks expert system 202 to solve a text term 211 which is either a fragment term 1003 or is defined as a concatenation involving fragment terms 1003. The general method employed by expert system 202 to solve a term is described in the discussion of the WHAT function in section 7 above. When the term being solved is a fragment term 1003, term inferencing engine 219 employs WPT SOLVE function 1103. The term inferencing engine provides each fragment term in order to WPT SOLVE, and WPT SOLVE evaluates the fragment term 1003 by determining from any condition contained in fragment term 1003's definition whether the fragment text 1005 represented by the term is to be included in the output document. If it is, WPT SOLVE 1103 provides fragment term 1003, suitably delimited, to the WHAT function as the value of fragment term 1003. If the fragment is to be included, WPT SOLVE 1103 further uses fragment term 1003 to locate fragment name 1113 in fragment term list 1107, employs editor 1105 and fragment name 1113 to locate fragment text 1005 in template document 1001, uses editor 1105 to locate each merge term 1007 in fragment text 1005, and provides each merge term 1007 to inference engine 219 for evaluation. Inference engine 219 evaluates the term and retains any external values needed for its evaluation as described in Section 7 above.

The result of operation of the WHAT function is the script. In the script, The fragment terms 1003 are delimited in the text value so that they are distinguished from other text in the text value and appear in the order in which the fragment text 1005 will appear in output document 1111. As with the results of the WHAT function generally, the script is displayed. Display of the script is advantageous because it permits a developer of a template 1001 a set of term definitions involving template 1001 to determine the correctness of the term definitions without generating document 1111. In other embodiments, no script may be displayed, the value provided to the WHAT function by WPT SOLVE may contain text 1005 with any merge terms 1007 replaced by their values, and the value provided to the WHAT function may be output directly to editor 1105 for inclusion in generated document 1111.

When inferencing engine 219 displays the script, it offers the user the option of making generated document 1111; when the user elects to do so, WPT SOLVE 1103 asks the user for the name of generated document 1111, uses editor 1105 to create generated document 1111, and then reads the script. For each fragment term 1003 in the script, it uses FT List 1107 to obtain the corresponding fragment name 1113, provides the fragment name to editor 1105 to locate fragment text 1005, uses editor 1105 to copy fragment text 1005 from template 1001 to generated document 1111, then uses editor 1105 to read fragment text 1105 in generated document 1111 until a merge term 1007 is encountered, reads the merge term 1007, obtains the value of merge term 1007 from inferencing engine 219, which recomputes it using the stored external values, determines from MT List 1109 whether the merge term's value is to be capitalized, and uses editor 1105 to replace merge term 1007 with the stored value, capitalizing the first letter if MT List 1109 so indicates. If the merge term 1007 is a fragment term 1003, WPT SOLVE 1103 proceeds as just indicated for the fragment 1002 represented by that fragment term 1003.

Figure 12:
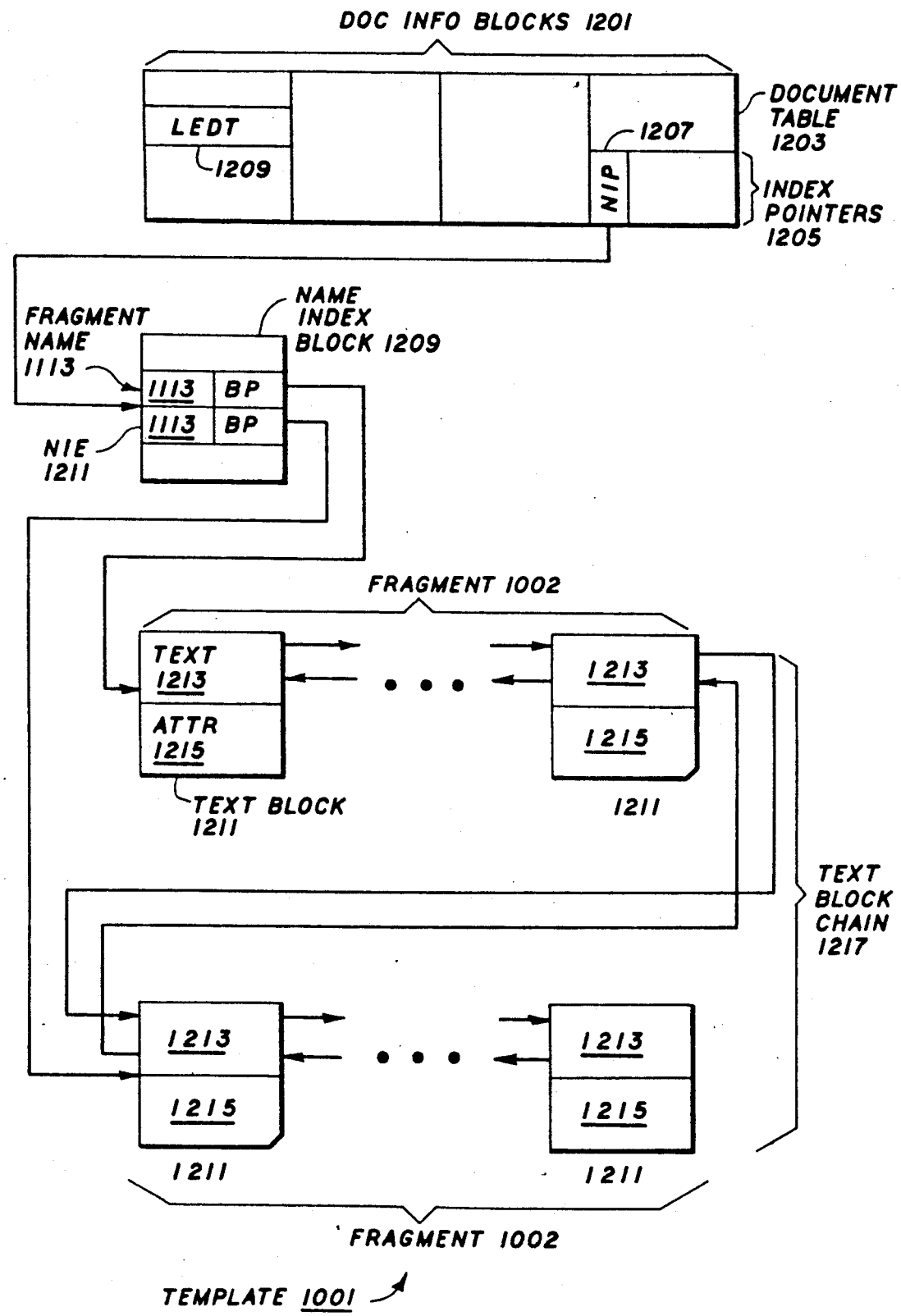
FIG. 12 is a diagram of the document structure of the example template document.

29. Implementation Details of Template 1001 and Index 1106: FIGS. 12-14

The documents employed in the preferred embodiment are all represented by means of the document structure used by the WP+ editor. FIGS. 12-13 show those aspects of the document structure which are relevant to the present invention. A further description of the document structure may be found in U.S. Pat. No. 4,751,740, T. Wright, *Apparatus, Method, and Structure for Translating a Document Having One Structure into a Document Having Another Structure,* issued 6/14/88. The portions of the patent which are of particular relevance are col. 13, line 21-col. 15, line 9, and FIG. 10. U.S. Pat. No. 4,751,740 is hereby incorporated by reference into the present disclosure. As may be seen from FIG. 13, in the document structure employed by the WP+ editor, the document is represented by means of a set of blocks which are addressable by block number. The blocks are all of the same size, but fall into three distinct functional groups: administrative blocks, index blocks, and text blocks.

The administrative blocks appear in FIG. 13 as doc info blocks 1201 and document table 1203. Doc info blocks 1201 contain information about the document represented by the structure, including a field 1209 which indicates the time and date at which the document was last edited. As previously described, this field is used in the present invention to determine whether a template 1001 has been edited outside of definition-based expert system 201. Document table 1203 contains pointers 1205 to a number of indexes; the only one which is of interest in the present context is a name index pointer 1207 to a name index which relates names to locations of text blocks. The name index is made up of one or more name index blocks 1209, only one of which is shown in FIG. 12. If more than one is required, chains and trees of name index blocks are constructed. Each name index block contains name index entries 1211 arranged in alphabetical order. The entries which are of interest for the present discussion relate fragment names 1113 to locations of text blocks.

The text blocks contain the text of the document. Each text block 1211 contains a text portion 1213, in which the characters making up the text are stored, and an attribute portion 1215, which contains information concerning locations in text portion 1213. In a template 1001, the attribute portion contains the information which indicates that a sequence of characters in text portion 1213 is a fragment term 1003 or a merge term 1007. The text blocks are organized into a doubly linked text block chain 1217. In a template 1001, text block chain 1217 represents the fragments 1002; two such fragments are shown in chain 1217. The beginning of each fragment 1002 may be located by means of the name index; fragment name 113 is used to located name index entry 1211 for that name 113 and the block pointer is followed to the block which begins the chain When Editor 1105 establishes a named mark, it splits blocks in text chain 1217 so that the position indicated by the named mark is the first character in text 1213 of a text block 1211. Editor 105 further includes special routines available to application programs for returning information from doc info blocks 1201, for reading characters and attributes from text blocks 1211, for writing characters and attributes to text blocks 1211, for finding named locations in text block chain 1217, and for copying material to and deleting material from text block chain 1217.

FIG. 13 shows short display attribute word 1301, the kind of attribute word used in template 1001 to indicate a fragment term attribute and a merge term attribute. The attribute words for the text in text 1213 of a text block 1211 are contained in that text block's attribute area 1215. The attribute words are stored in reverse order from the text, i.e., attributes applying to the first character in text portion 1213 are at the end of attribute portion 1215. As editor 1105 writes a text block 1211, it adds characters by working backwards from the beginning of text 1213; it adds attributes for the characters by working forwards from the end of attributes 1215; when there is no empty space between the end of text 1213 and the end of attributes 1215, the block is full. When editor 1105 reads text from text 1213, it simultaneously reads the attributes in attributes 1215 and provides codes indicating which attributes apply to the character currently being read. There are four fields in attribute word 1301: a type field, which indicates what kind of attribute the word represents, an auxiliary type field 1305 which offers additional information concerning the type, a start field, which indicates the position in text 1213 of the first character in a sequence of characters to which the attribute applies, and an end field 1309 which indicates the position in text 1213 of the last character of the sequence. In a preferred embodiment, the fragment term attribute and the merge term attribute are indicated by different values in type field 1303. Using the information from attribute words 1301 for the fragment term and merge term attributes, WPTDEF 1101 and WPTSOLVE 1103 are able to determine whether a sequence of characters in a fragment 1002 is a fragment term or a merge term and are able to identify the end of a fragment.

FIG. 14 is a detail of entries in the components of index 1106. There is a single control record 1108 in index 1106 for a given template 1001. Two items of information are included: template name 1401, which is the name of template document 1001 to which index 1106 belongs, and last time edited 1403, which indicates the last time that WPT DEF 1101 changed template document 1101 to which index 1106 belongs. There is a fragment term list entry 1405 for each fragment in template 1001. As previously mentioned, the list is organized as a b-tree permitting rapid access of fragment term list entries 1405 by fragment term 1003. Each fragment term list entry 1405 contains a fragment term 1002 and fragment name 113 for the fragment 1002 identified by fragment term 1003. Finally, there is a merge term list entry 1407 for each merge term 1007 in each fragment 1002 of template 1001. Again, the merge term list is organized as a b-tree permitting rapid access of merge term list entries 1407 for a fragment 1002 by fragment term 1003 for the fragment 1002. Each merge term list entry 1407 contains fragment term 1003 for the fragment 1002 to which the merge term 1007 belongs, the merge term 1007 and a capitalization flag 1409 which is set by WPT DEF 1101 to indicate that the first letter of the value which replaces the merge term 1007 when the merge term 1007 is solved is to be capitalized As previously indicated, the user of definition-based expert system shell 1201 indicates that the value should be capitalized by capitalizing the first letter of the merge term. The merge term entries 1407 for a given fragment term 1003 are arranged in MT List 1109 alphabetically by merge term 1007.

The foregoing additional disclosure has shown how a document generation system may be developed using the definition-based expert system disclosed in sections 1-22 above, the WP+ editor, and a template document 1001 produced by the WP+ editor. While definition-based expert system 201, the WP+ editor, and the document structure used by the WP+ editor are all particularly well-suited for implementing the invention, the invention may also be implemented using other types of expert systems, other editors, and other document structures. In particular, techniques other than those disclosed herein may be used to identify fragment terms and merge terms in template 1001, to permit location of fragments in template 1001, and to determine whether a fragment term or a merge term has already been defined. Further, in some embodiments, the step of producing a script may be omitted and the solve operation may result in the immediate output of the generated document. This being the case, the disclosed embodiments are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. A document generation system for generating an output document comprising:
    a template document;
    an expert system knowledge base for storing knowledge base items;
    editing means for editing the template document and the output document;
    expert system knowledge base defining means for defining the knowledge base items in response to first user inputs, the knowledge base defining means including document portion defining means responsive to one of the first user inputs for defining a document portion knowledge base item associated with a portion of the template document by providing the editing means to the user to edit the portion and associating the edited portion with the document portion knowledge base item in the knowledge base; and expert system inference engine means for providing expert responses in response to second user inputs and the knowledge base items, the inference engine means including output document generation means responsive to a document portion knowledge base item for employing the editing means to provide the document portion associated with the document portion knowledge base item to the output document when the document portion knowledge base item and the second user inputs so require.

2. The document generation system set forth in claim 1 wherein:

the editing means includes means for identifying a text string in a document portion as a term representing a value returned by the expert system inference engine means; and the output document generation means detects the identified term in the provided document portion, provides the identified term to the inference engine, receives the value of the identified term from the inference engine, and outputs the received value to the output document in place of the identified term 3. A document generation system for generating an output document comprising:

a template document;

editing means for editing the template document and the output document;

a knowledge base including hierarchically defined terms and their definitions, the corresponding definition of each term defining its respective term using the value of one or more terms, each whose definitions is at a lower level of the hierarchy, and/or using one or more term-independent values which do not depend on the value of a term;

knowledge base defining means for defining the terms in response to first user inputs, the knowledge base defining means including document portion term defining means for defining a document portion term of the terms which is associated with a portion of the template document, the document portion term defining means providing the editing means to the user to edit the portion and associating the edited portion with a definition of the document portion term in the knowledge base; and inference engine means for responding to second user inputs by obtaining the definition of a given term from the knowledge base, computing the value of the given term from its corresponding definition by obtaining the value of any term and any term-independent value in the corresponding definition, the inference engine means including output document generation means for obtaining the value of a document portion term by employing the editing means to provide the document portion associated with the document portion term to the output document when the document portion knowledge base item and the second user inputs so require.

4. The document generation system set forth in claim wherein:

the editing means includes means for identifying a text string in a document portion as a term;

the document portion term defining means detects the identified term in the document portion and provides the detected term to the knowledge base defining means;

the knowledge base defining means responds to the detected term by determining whether there is a definition for the detected term in the knowledge base and if there is not, requesting first user inputs from the user and defining the detected term therefrom; and the output document generation means detects the identified term in the provided document portion, provides the identified term to the inference engine, receives the value of the identified term from the inference engine, and outputs the received value to the output document in place of the identified term.

5. The document generation system set forth in claim 4 wherein:

the identified term is a document portion term referring to another portion of the template document.

6. The document generation system set forth in claim 3 wherein:

the document portion term defining means includes a condition dependent on the value of another term in the definition of the document portion term; and the inference engine means computes the value of the other term and causes the output document generation means to obtain the value of the document portion term only if the condition is fulfilled.

7. The document generation system set forth in claim 3 wherein:

the editing means additionally edits the template document independently of the document portion term defining means and employs first identification means to identify a text string in the document portion defining the document portion term as the document portion term; and the document portion term defining means additionally detects the document portion term in the document portion by means of the first identification means and responds thereto by defining the document portion term in the knowledge base and associating the document portion with the document portion term with the defined document portion term.

8. The document generation system set forth in claim 7 wherein: the editing means additionally employs second identification means for identifying a text string in a document portion as a term other than the document portion term defined by the document portion; and the document portion term defining means detects the identified other term in the document portion by means of the second identification means and provides the detected other term to the knowledge base defining means;

the knowledge base defining means responds to the detected other term by determining whether there is a definition for the detected term in the knowledge base and if there is not, requesting first user inputs from the user and defining the detected other term therefrom; and the output document generation means detects the identified other term in the provided document portion by means of the second identification means, provides the identified other term to the inference engine, receives the value of the identified other term from the inference engine, and outputs the received value to the output document in place of the identified other term.

* * * * *